(12) United States Patent
He et al.

(10) Patent No.: US 7,942,315 B2
(45) Date of Patent: May 17, 2011

(54) SELF-SERVICE TERMINAL

(75) Inventors: Chao He, Dundee (GB); Theodoros Damoulas, Salonika (GR); Mark Girolami, Glasgow (GB)

(73) Assignee: NCR Corporation, Duluth, GA (US)

( * ) Notice: Subject to any disclaimer, the term of this patent is extended or adjusted under 35 U.S.C. 154(b) by 779 days.

(21) Appl. No.: 11/899,381

(22) Filed: Sep. 5, 2007

(65) Prior Publication Data
US 2009/0057395 A1    Mar. 5, 2009

(51) Int. Cl.
*G07D 11/00* (2006.01)
(52) U.S. Cl. .............. 235/379; 235/375; 705/35
(58) Field of Classification Search .............. 235/375, 235/379, 380; 705/18, 43, 44
See application file for complete search history.

(56) References Cited

U.S. PATENT DOCUMENTS
2005/0255919 A1* 11/2005 Nelson ............... 463/40
2006/0169764 A1*  8/2006 Ross et al. ............ 235/375

OTHER PUBLICATIONS

Girolami et al., "Hierarchic Bayesian Models for Kernel Learning", Bioinformatics Research Centre, Department of Computing Science, University of Glasgow, G12 8QQ, UK.
Albert et al., "Bayesian Analysis of Binary and Polychotomous Response Data", Journal of the American Statistical Association, vol. 88, No. 422 (Jun. 1993), pp. 669-679, http://www.jstor.org, Tue Mar. 20 13:24:16 2007.

* cited by examiner

Primary Examiner — Thien M. Le
Assistant Examiner — Christle I Marshall
(74) Attorney, Agent, or Firm — Paul W. Martin

(57) ABSTRACT

A method of detecting attempted fraud at a self-service terminal. The method involves providing a classifier having a plurality of input zones, each input zone being adapted to receive data of a different modality. The classifier may be a statistical model. The method also involves mapping inputs from a plurality of sensors in the self-service terminal to respective input zones of the classifier. For each input zone, the classifier independently operates on inputs within that zone to create a weighted set; combines the weighted sets using a dedicated weighting function for each weighted set to produce a composite set; and derives a plurality of class values from the composite set to create a classification result. The classification result can be used to predict the probability of abnormal operation, which may be indicative of fraud.

12 Claims, 12 Drawing Sheets

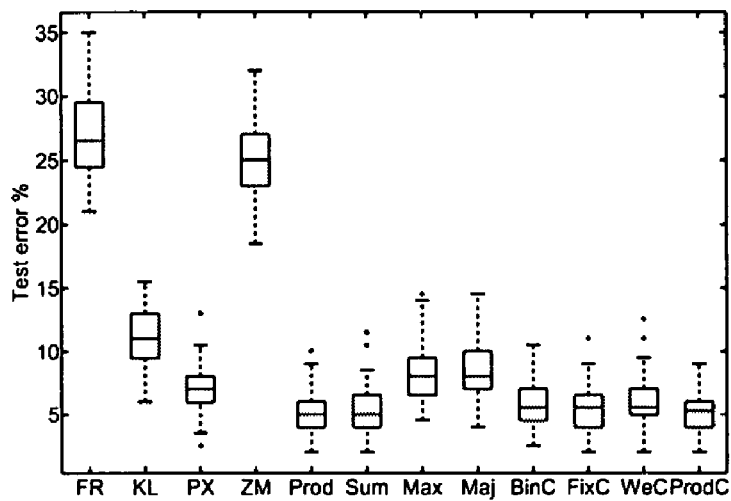
Fig. 12
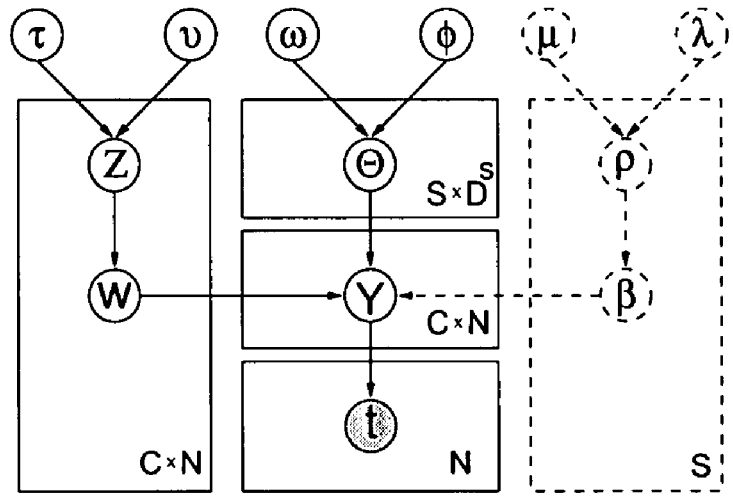
Fig. 13
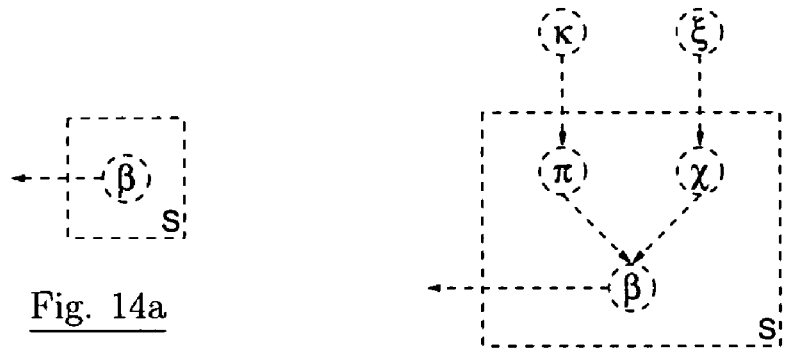
Fig. 14a
Fig. 14b

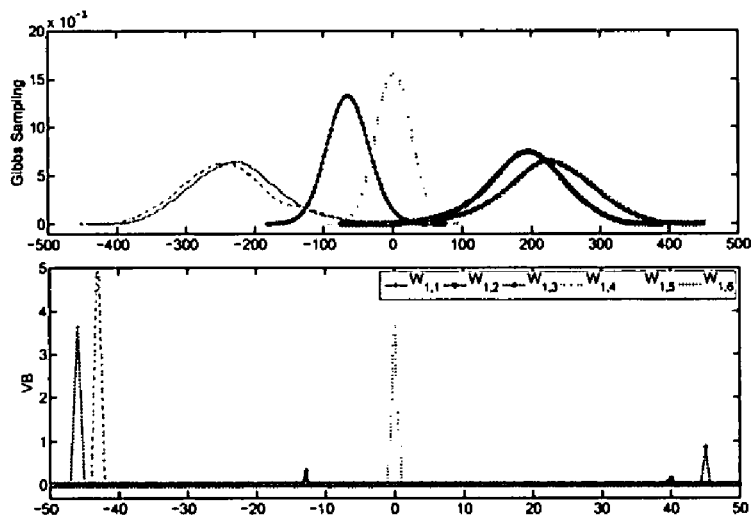
Fig. 17
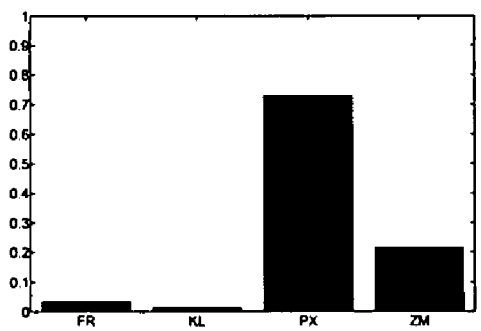 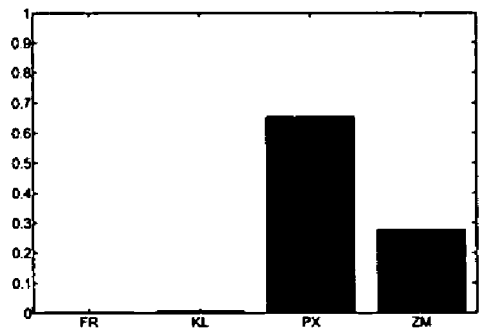
Fig. 18a Fig. 18b
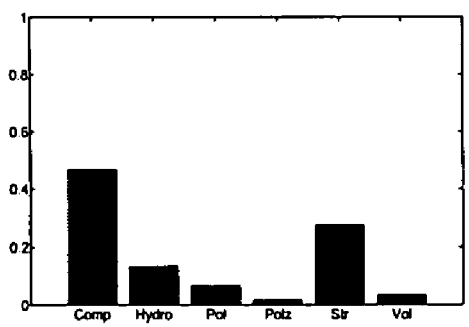 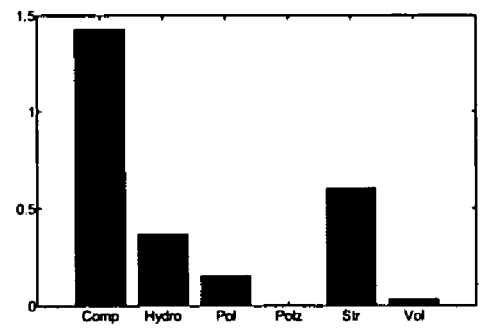
Fig. 19a Fig. 19b

SELF-SERVICE TERMINAL

The present invention relates to a self-service terminal (SST) and to a statistical model for use therewith.

SSTs are public access devices that are suitable for allowing a user to conduct a transaction or to access information in an unassisted manner and/or in an unattended environment. An SST deployer may decide to provide human assistance and/or supervision for users of the SST; however, SSTs are typically designed so that such assistance and/or supervision is not essential.

Common examples of SSTs include automated teller machines (ATMs), information kiosks, financial services centres, bill payment kiosks, lottery kiosks, postal services machines, check-in and check-out terminals such as those used in the hotel, car rental, and airline industries, retail self-checkout terminals, vending machines, and the like.

Many types of SSTs, such as ATMs, allow customers to conduct valuable transactions. As a result, ATMs are sometimes the targets of fraudulent activity. There are a number of known types of fraud at an ATM, including: card trapping, card skimming, false keypad overlays, false overlays on the ATM fascia, concealed video cameras, and the like.

ATM anti-fraud measures are known, but it is sometimes difficult to differentiate between legitimate activity (e.g. a customer who places his/her ring finger close to the ATM's fascia) and fraudulent activity (e.g. a miniature reader placed near a card reader).

It would be useful to have a system that could analyse ATM activity and ascertain if there is a high probability that fraud is taking place.

According to a first aspect of the present invention there is provided a method of detecting attempted fraud at a self-service terminal, the method comprising: providing a classifier having a plurality of input zones, each input zone being adapted to receive data of a different modality; mapping inputs from a plurality of sensors in the self-service terminal to respective input zones of the classifier; for each input zone, independently operating on inputs within that zone to create a weighted set; combining the weighted sets using a dedicated weighting function for each weighted set to produce a composite set; deriving a plurality of class values from the composite set to create a classification result.

The step of operating on inputs within a zone to create a weighted set may comprise using base kernels to create a weighted set. The base kernels may be Gaussian (radial basis) kernels, or other types of kernels appropriately chosen to describe each modality on the basis of its nature (for example, string kernels for text, sinusoidal kernels for audio and frequencies, and the like).

Each base kernel may have a unique kernel parameter ($\theta$), such that each base kernel has a different kernel parameter.

Use of kernels allows a matrix to be created in which each value indicates the measure of similarity of two objects (input values).

The step of deriving a plurality of class values from the composite set to create a classification result may include using regression techniques (such as kernel regression) to derive the plurality of class values. The plurality of class values can then be used as an auxiliary variable to predict the classification result.

A modality may be defined by the type and/or format of information provided, for example a fixed array size of bits (such as 640×480 bits from a digital imager), thereby enabling inherently different sources of information (e.g. audio sources and video sources) to be operated on differently then combined.

The classifier may implement a Bayesian model, such as a hierarchical Bayesian model.

The classifier may use different parameters for different operating modes of the SST.

As used herein, classification relates to being able to learn and/or predict in which category an object belongs, the object typically being represented by input values. In some embodiments, there may only be two categories (e.g. normal and abnormal), in other embodiments there may be three categories (normal, suspicious, abnormal), or more than three categories. Classification is used herein in a generic sense to include clustering.

By virtue of embodiments within this aspect of the invention, a Bayesian model can be provided that includes a multi-class classifier comprising a hierarchy of kernels, wherein a composite kernel retains the dimensionality of base kernels from which the composite kernel is derived. This allows the combination of kernels (and therefore the combination of types of information) to be trained, thereby allowing information to be weighted according to its type (or modality). This is in contrast to prior art approaches of combining multiple trained individual classifiers to create a composite result.

Use of a composite kernel actually allows manipulation of the individual kernels because different weighting functions can be used for each individual kernel to create the composite kernel.

An advantage of an embodiment of this invention is that a Bayesian hierarchical model can be used to determine in what proportions base kernels should be combined to produce a composite kernel that optimises predictive performance.

According to a second aspect of the present invention there is provided a method of detecting attempted fraud at a self-service terminal, the method comprising: providing a classifier comprising a statistical model; mapping inputs from sensors in the self-service terminal into the classifier; and operating on the inputs using the statistical model to predict a probability of fraud.

The method may include the further step of communicating an alarm signal to a remote host in the event that the probability of fraud exceeds a predetermined level.

The statistical model may be a Bayesian model, such as a hierarchical Bayesian model.

The sensors may be associated with a plurality of customer interaction devices, such as a card reader, a cash dispense aperture, an encrypting keypad, and the like.

According to a third aspect of the present invention there is provided a self-service terminal comprising: a plurality of customer interaction devices; and a controller coupled to the customer interaction devices for controlling their operation, the controller including a classifier comprising a statistical model to predict a probability of fraud based on inputs received from the customer interaction devices.

The self-service terminal may be an automated teller machine (ATM), information kiosk, financial services centre, bill payment kiosk, lottery kiosk, postal services machine, check-in and check-out terminal such as those used in the hotel, car rental, and airline industries, or a retail self-checkout terminal.

The customer interaction devices may be selected from the group comprising: a card reader, a display, an encrypting keypad, a receipt printer, a statement printer, a dispenser, a cheque processing module, a cash recycler, a depository, or the like.

The inputs received from the customer interaction devices may be grouped according to format, so data in one format may be grouped as a first set, and data of another format may be grouped as a second set.

According to a fourth aspect of the present invention there is provided a method of operating a network of self-service terminals coupled to a management system, where each terminal includes a classifier for predicting fraud based on the operation of that terminal, the method comprising: receiving a communication from a self-service terminal indicating that the classifier in that terminal has predicted a probability of fraud; and triggering a dispatch signal to dispatch a customer engineer to the self-service terminal to ascertain if fraud is being perpetrated.

The management system may be operable to transmit an updated statistical model for a classifier in the event that a better statistical model (for example, a statistical model having parameters that more accurately recognize attempted fraud) becomes available. In some embodiments, the management system may only transmit new parameters for the classifiers in the SSTs.

The management system may be operable to transmit a risk parameter that indicates a probability of fraud value that must be reached for the SST to suspect fraud.

According to a fifth aspect of the present invention there is provided a hierarchical Bayesian model for use in classifying events.

These events may occur within a device or in a network of devices.

These and other aspects of the present invention will be apparent from the following specific description, given by way of example, with reference to the accompanying drawings, in which:

FIG. 3b is a diagram illustrating the main features of one of the software components (a statistical model) of FIG. 3a;

FIG. 5b is a diagram illustrating the main features of one of the software components (a statistical model) in the banknote acceptance module of FIG. 5a;

FIG. 12 is a graph illustrating the performance of different types of classifiers;

FIG. 13 is a diagram showing a hierarchical Bayesian classification model for mean composite kernels suitable for use with the embodiments of FIGS. 1 and 5;

FIGS. 14a and 14b illustrate how FIG. 13 may be modified to provide a binary composite kernel (FIG. 14a) and a product composite kernel (14b);

FIG. 17 are graphs illustrating parameter posterior distributions from Gibbs sampling and from a Variational Bayes approximation;

FIGS. 18a and 18b illustrate typical combinatorial weights from Mean (FIG. 18a) and Product (FIG. 18b) composite kernels; and FIGS. 19a and 19b illustrate typical combinatorial weights from Mean (FIG. 19a) and Product (FIG. 19b) composite kernels for a protein fold dataset.

Figure 1:
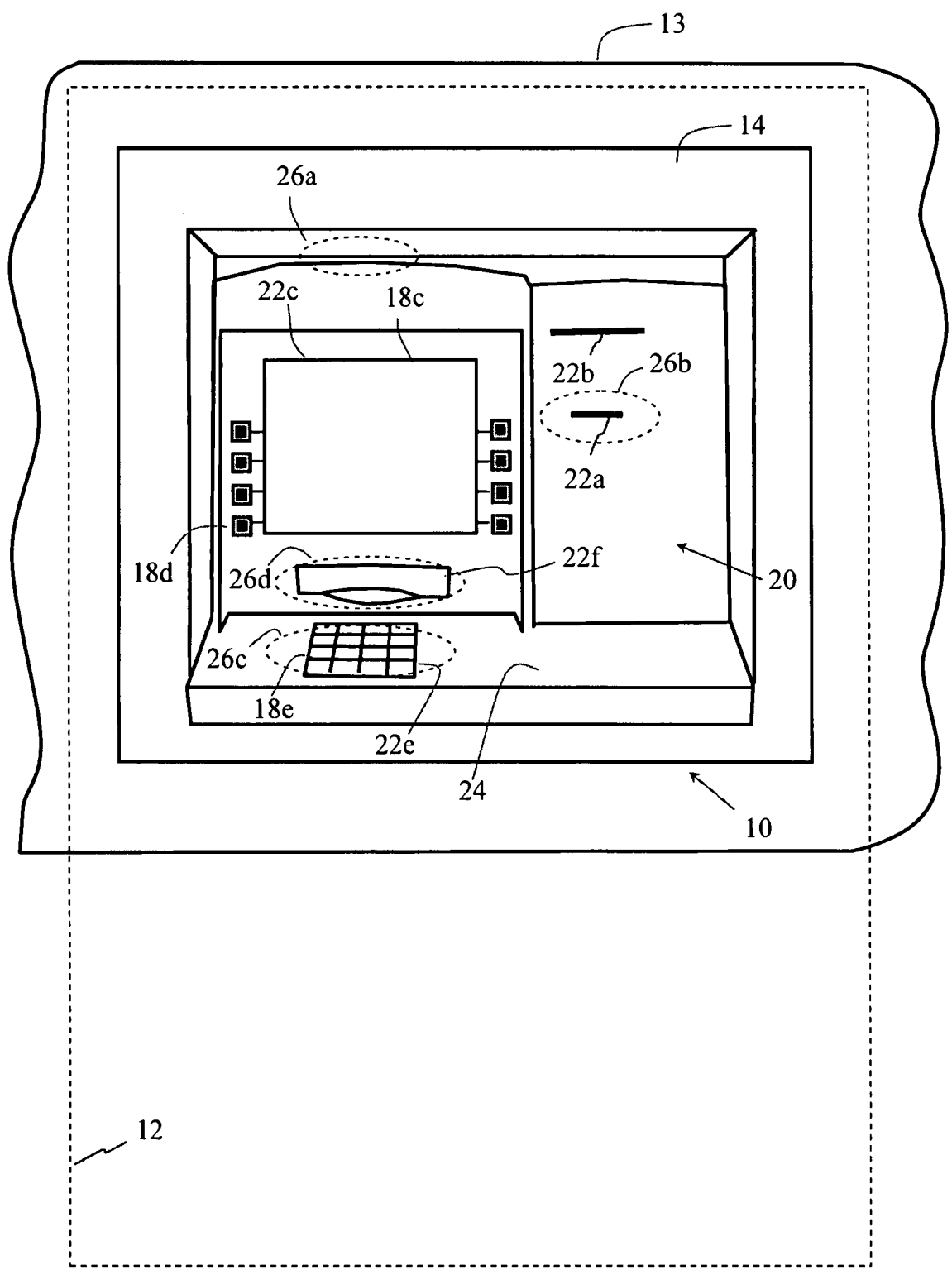
FIG. 1 is a pictorial front view of a self-service terminal (in the form of an ATM) according to one embodiment of the present invention.
Figure 2:
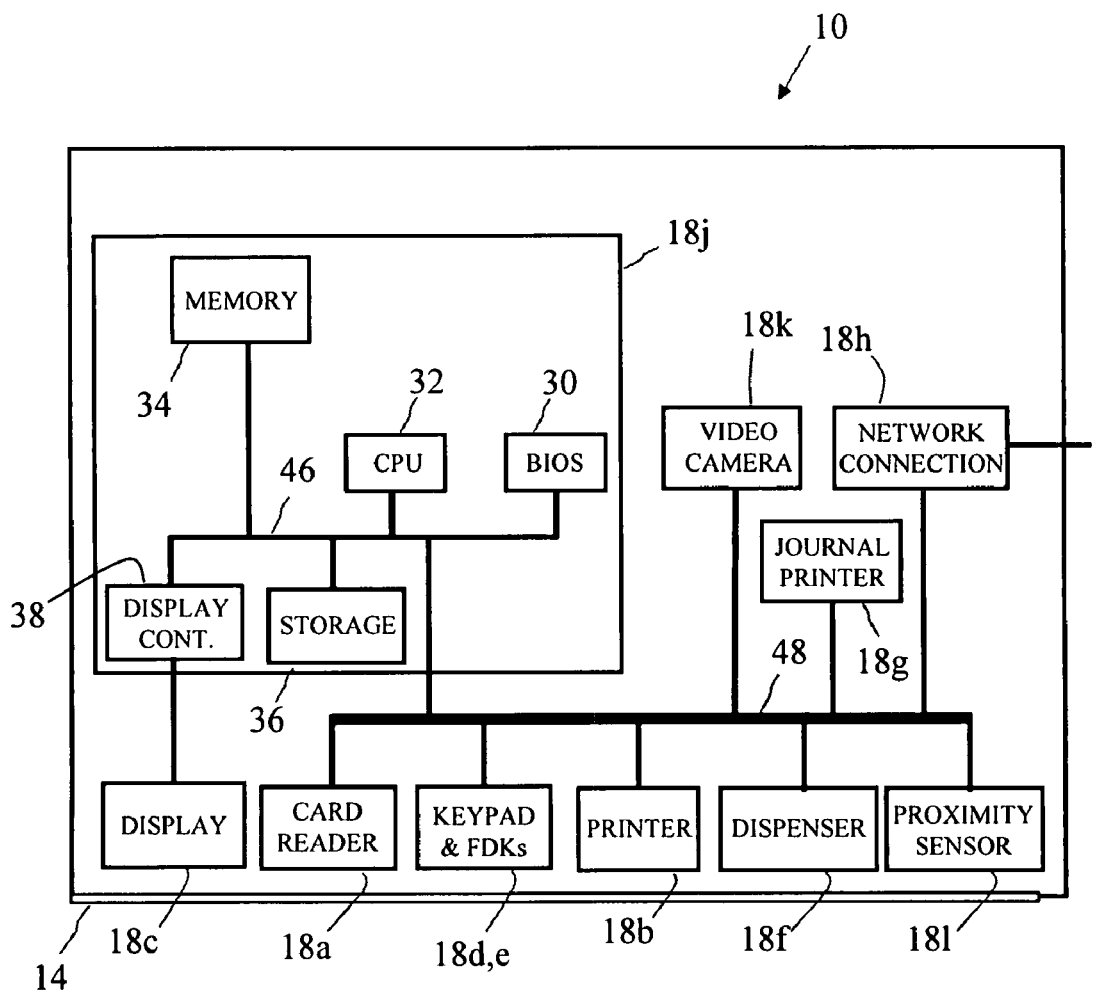
FIG. 2 is a block diagram showing the ATM of FIG. 1 in more detail.

Reference is first made to FIG. 1, which is a pictorial front view of a self-service terminal 10, in the form of a through-the-wall (TTW) ATM, according to one embodiment of the invention. Reference is also made to FIG. 2, which is a schematic diagram illustrating the ATM 10 of FIG. 1 and showing internal devices mounted therein.

The ATM 10 has a chassis 12 (shown in dotted line) protruding in part through an aperture in a wall 13, and on which chassis 12 is mounted a plastic fascia 14. The ATM 10 is a rear access ATM having an access door (not shown) hingably coupled to the rear of the chassis 12. When the door (not shown) is swung open, an operator can gain access to devices 18 (best seen in FIG. 2) located within the ATM 10.

The fascia 14 provides part of a user interface 20 to allow a customer to interact with the ATM 10. In particular, the fascia 14 has apertures (or slots) 22 aligning with devices 18 when the fascia 14 is moved to the closed position.

The fascia 14 defines: a card reader slot 22a aligning with a card reader device 18a; a receipt printer slot 22b aligning with a receipt printer device 18b; a display aperture 22c aligning with a display 18c and associated function display keys (FDKs) 18d disposed as two columns, each column located on an opposing side of the display 18c; a keypad aperture 22e through which an encrypting keypad device 18e protrudes; and a dispenser slot 22f aligning with a dispenser device 18f.

With the exception of the encrypting keypad 18e, the devices 18 are all mounted within the chassis 12. The encrypting keypad 18e is mounted on a shelf portion 24 of the fascia 14, which extends outwardly from beneath the display aperture 22c.

Certain areas of the fascia 14 are susceptible to attacks. Fraudsters sometimes place hidden cameras near area 26a to record a customer entering his/her PIN. Fraudsters can place card trapping devices or magnetic card readers in area 26b to capture a customer's card or details from a customer's card. False keypad overlays can be placed in area 26c. False shutters can also be used in area 26d to cover the dispenser slot 22f and thereby obscure banknotes that have been dispensed by the ATM 10.

Referring now to FIG. 2, the ATM 10 also includes the following internal devices 18 that are not directly viewed or accessed by a customer during the course of a transaction. These devices 18 include: a journal printer device 18g for creating a record of every transaction executed by the ATM 10, a network connection device 18h for accessing a remote authorisation system (not shown), and a controller device 18j (in the form of a PC core) for controlling the operation of the ATM 10, including the operation of the other devices 18. These devices 18g,h,j are all mounted within the chassis 12 of the ATM 10.

The controller 18*j* comprises a BIOS 30 stored in non-volatile memory, a microprocessor 32, associated main memory 34, storage space 36 in the form of a magnetic disk drive, and a display controller 38 in the form of a graphics card.

The display 18*c* is connected to the microprocessor 32 via the graphics card 38 and one or more internal controller buses 46. The other ATM devices (18*a, b,* and 18*d* to 18*h*) are connected to the ATM controller 18*j* via a device bus 48 and the one or more internal controller buses 46.

In addition to these conventional ATM devices, the ATM 10 includes devices for detecting fraud. These devices include a video camera 18*k* located in area 26*a*, and a proximity sensor 18*l* located in area 26*b*. The video camera 18*k* is oriented to capture an image covering areas 26*b*, 26*c*, and 26*d*. The proximity sensor 18*l* uses capacitance and inductance to detect devices located in area 26*b*. Thus, these two anti-fraud devices 18*k*, 18*l* monitor the areas on the ATM 10 that are most susceptible to fraud.

Initialisation of the ATM

Figure 3A:
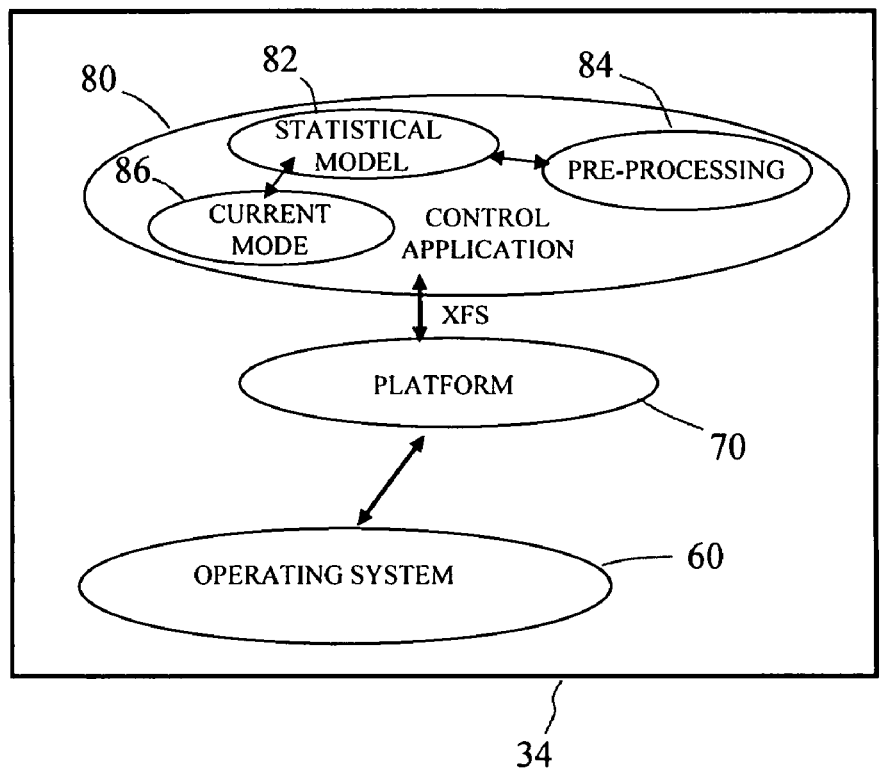
FIG. 3a is a schematic diagram illustrating software components executing in a part (the controller) of the ATM of FIGS. 1 and 2.

When the ATM 10 is booted up, the microprocessor 32 accesses the magnetic disk drive 36 and loads the main memory 34 with software components, as will be described with reference to FIG. 3*a*, which is a schematic diagram illustrating how software components interact in main memory 34.

Operating System

The microprocessor 32 loads an operating system kernel 60 into the main memory 34. In this embodiment, the operating system is a Windows XP (trade mark) operating system, available from Microsoft Corporation.

Run-time Platform

The microprocessor 32 also loads a run-time platform 70 into the main memory 34. In this embodiment, the runtime platform 70 is a set of APTRA (trade mark) XFS components, available from NCR Corporation, 1700 S. Patterson Blvd., Dayton, Ohio 45479, U.S.A. The run-time platform 70 provides a range of programming facilities specific to self-service terminal devices and services.

One function of the run-time platform 70 is to enhance the operating system 60 so that the operating system and run-time platform 70 together provide high level access to all of the devices 18, including both standard computing devices (via the operating system 60), and non-standard computing devices (via the run-time platform 70). Thus, the combination of the run-time platform 70 and the operating system 60 can be viewed as providing a complete ATM operating system.

Control Application

The microprocessor 32 also loads a control application (CA) 80 into the main memory 34. The CA 80 provides transaction processing functions (for customers and for maintenance personnel) and device management functions. One of the device management functions is to maintain logs and tallies relating to the operation of the devices. Other device management functions include providing device status lists, device servicing (including self-testing) and device configuration information.

Statistical Model

The control application 80 includes: (i) a component 82 including a statistical model, and (ii) a pre-processing component 84. In this embodiment, the statistical model 82 is a multinomial probit classifier with composite kernels. The theoretical basis and the mathematical formulae for this statistical model are provided in more detail below under the heading "Theoretical Considerations".

Figure 3B:
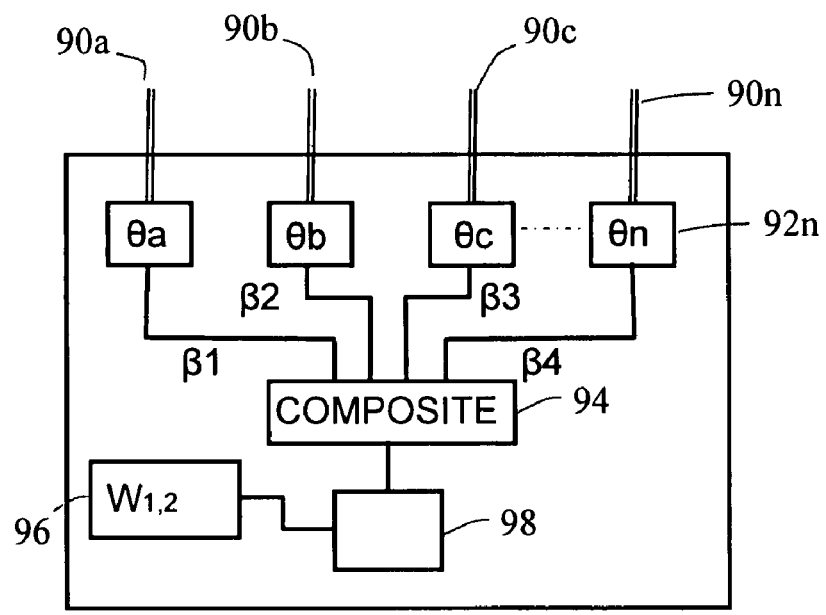

The high-level structure of the statistical model 82 will now be described with reference to FIG. 3*b*, which is a schematic diagram illustrating the hierarchy of the statistical model 82.

The statistical model 82 has multiple inputs. These multiple inputs are organized into zones 90*a,b,* . . . *n*, each input zone 90 (which may have one or a plurality of input lines) being adapted to receive a specific type (or modality) of information. Each input zone 90 is coupled to a respective base kernel 92*a, b,* . . . *n*, having a unique weighting parameter (θ). The weighting parameter (θ) is used to create values for a base kernel using data from its respective input zone 90.

The values at corresponding locations in the weighted base kernels are combined to form a composite kernel (illustrated by box 94) using a unique weighting function (β) for each base kernel 92. The value of the unique weighting function for each base kernel 92 determines how important data from that base kernel 92 will be in classifying an input.

The composite kernel 94 is then operated on by another function, in this example a regression kernel, illustrated by box 96. The regression kernel includes a unique regression parameter (W) for each row of the composite kernel. In this example there are two possible classifications: normal and abnormal (fraudulent), so there are two rows in the composite kernel, and two unique regression parameters.

The regression kernel 96 is used to create an auxiliary variable (illustrated by box 98) that indicates the probability for each classification. In this embodiment there are only two values: the first value represents the probability that the input data corresponds to normal operation, and the second value represents the probability that the input data corresponds to abnormal (that is, fraudulent) operation.

The various parameters (such as θ, β, and W) can be obtained from a training set using, for example, Gibbs sampling or a Variational Bayes Approximation, as described in more detail under the "Theoretical Considerations" section below.

In general, the pre-processing component 84 receives data from sensors and devices in the ATM 10, processes this data (if necessary), and feeds the processed data to the statistical model 82.

For example, the pre-processing component 84 receives a sequence of images from the video camera 18*k* and processes these images to (i) identify the parts of each image that are of interest, (ii) discard all other parts of the image other than the parts of interest, and (iii) forward the parts of interest to the appropriate input zones 90 of the statistical model 82.

In this example the parts of interest correspond to areas 26*b,c,* and *d,* as these are the areas most susceptible to placement of a third party device for fraudulent purposes. Those parts of interest corresponding to area 26*b* will all be forwarded to input zone 90*a*; those corresponding to area 26*c* will all be forwarded to input zone 90*b*; and those corresponding to area 26*d* will all be forwarded to input zone 90*c*.

The pre-processing component 84 also receives a sequence of intensity values from the proximity sensor 18*l* and conveys this data to a fourth input zone 90*d* of the statistical model 82.

In operation, the statistical model 82 continuously receives data at the input zones 90 and classifies the data according to whether the data is predicted to represent normal operation or abnormal (e.g. fraudulent) operation.

The control application 80 includes a current mode component 86 that informs the statistical model 82 of the current mode that the ATM 10 is operating in. For example, one mode is "out of service". In this mode, the ATM 10 cannot be used by customers, but may be operated on by maintenance personnel. Another mode is "attract sequence" mode in which the ATM 10 displays a welcome screen or an advertising screen on the ATM display 18c to solicit custom. Another mode is "card reading" mode, in which the card reader 18a is active in transporting and/or reading a customer's card. Another mode is "dispensing" mode, in which the ATM 10 exercises the cash dispenser 18f to dispense cash to a customer.

It is useful for the statistical model 82 to know what mode the ATM 10 is operating in because one type of activity detected at one stage of a transaction may be associated with normal behaviour (for example a customer blocking the dispenser slot 22f with his/her hand during a dispense operation); whereas, similar activity during a different stage of a transaction may be associated with abnormal behaviour.

Training the Statistical Model

Prior to use, the statistical model component 82 is trained to optimize the parameters included in the model (such as θ, β, and W, and the sub-parameters that feed these parameters). Training involves providing the statistical model 82 with data that represents normal activity, and is implemented by providing outputs of sensors and devices 18 for various normal operating conditions, and also providing outputs of sensors and devices 18 for various abnormal operating conditions.

During the training phase, for each mode of the ATM 10, various different samples of data are provided. For the video camera 18k, images are recorded in various conditions (strong sunlight, dim light, heavy rainfall, night-time, and the like) and with various items located on the fascia (a customer's hand, a disposable coffee cup, a handbag, and the like). An image is also recorded with a keypad overlay in place at area 26c. For each of these images, the pre-processing component 84 isolates area 26c on the image. The statistical model 82 then compares this isolated area with the corresponding isolated areas from every other image to produce a matrix indicating the degree of similarity of the images (that is, a base kernel 92b for the keypad 18e).

For each of the images discussed in the preceding paragraph, the pre-processing component 84 will also isolate pixels corresponding to area 26d. Another image will be captured with a false overlay on the dispenser shutter. Each of these isolated areas will be compared with each of the other isolated areas in turn to create a matrix indicating the degree of similarity of the images (that is, a base kernel 92c for the dispenser slot 22f). A similar procedure is performed for images of the card reader area 26b, so that another base kernel 92a is created for the card reader area 26b.

Data from other sensors, such as proximity sensor 18l, is fed into other base kernels 92, so that there is a base kernel 92d indicating the difference between the output of the sensor 18l during fraudulent activity and the output of the sensor 18l during a variety of conditions and when a variety of items are located in the vicinity of the card reader slot 22a.

The statistical model 82 predicts kernel parameters (θ) for each base kernel 92, a weighting function (β) for combining each base kernel 92 into a composite kernel 94, and a regression parameter (W) for each of the two rows of the composite kernel 94.

The value of these parameters may be different for each mode. For example, when the ATM 10 presents an attract screen, one set of parameters may be used; whereas, when the ATM 10 is about to dispense cash, another set of parameters may be used. For example, when in dispense mode (that is, the ATM 10 is about to dispense cash), the statistical model 82 may be trained with an image having a customer's hand placed in front of the dispenser slot 22f; such an image may not be used to train the statistical model 82 when the ATM 10 is in attract screen mode.

Because the statistical model 82 is implemented in software, it is easy to change the parameters immediately in response to a change in the ATM operating mode.

Operation of the ATM

Once the statistical model 82 has been trained, and all of the parameters have been derived (for each mode), then the statistical model 82 receives inputs from the various devices 18 and sensors in the ATM 10, and produces an output having two values. The first value indicates the probability that the data received at the input zones 90 is indicative of normal behaviour and the second value indicates the probability that the data received at the input zones 90 is indicative of abnormal behaviour.

Figure 4:
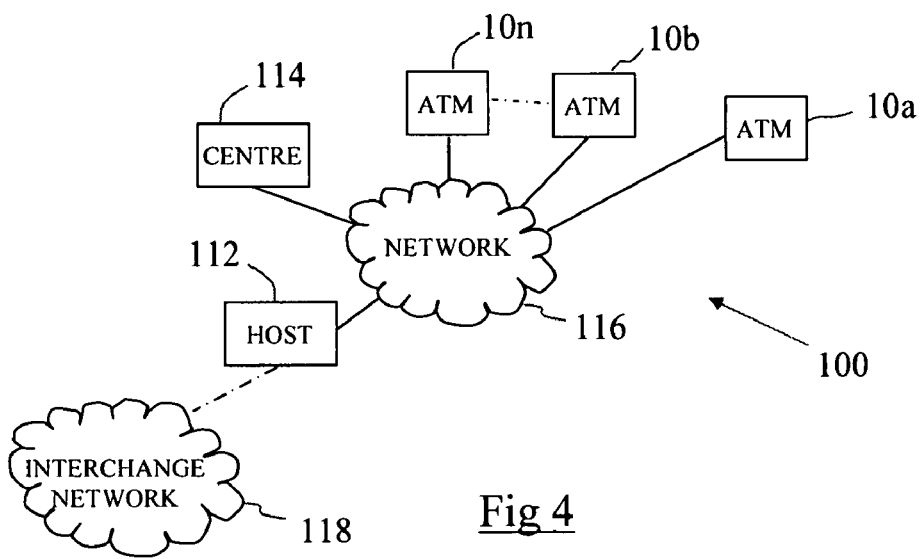
FIG. 4 is a block diagram illustrating a system including the ATM of FIGS. 1 and 2.

In the event that the probability of abnormal behaviour exceeds a fraud criterion, in this embodiment a predetermined threshold (for example 60%), then the control application 80 alerts a remote management system, as will now be described with reference to FIG. 4, which is a block diagram of an ATM network 100.

The ATM network 100 comprises a plurality of ATMs 10a,b, . . . n of the type described above, an authorization host 112 for approving ATM transaction requests, and a management center 114 in communication with the ATMs 10 either via a network 116 (as shown) or via the host 112.

The authorisation host 112 can authorise "on us" transactions (that is, where the ATM network owner is also the issuer of the card used by the customer), and can route "not on us" transactions to other authorisation hosts via interchange networks 118.

The management center 114 receives status messages and error messages from the ATMs 10 in the network 100. The management system 114 uses these messages to ascertain if maintenance personnel (such as a 20 customer engineer) should be deployed to maintain an ATM 10 in optimal operation. For example, the management system 114 may receive a status message indicating that ATM 10 is low on banknotes. The management system 114 may then despatch a replenisher to replenish that ATM 10.

When the probability of abnormal behaviour exceeds the fraud criterion (which may be fixed, or which may vary depending on a risk parameter transmitted to the ATM 10 from the management center 114), then the ATM 10 sends an alert signal to the management center 114, which then notifies an authorized person (for example, via email, text message, pager, or the like), such as a customer engineer, who will investigate whether fraud is indeed being perpetrated at that ATM 10.

Other Embodiment

Figure 5A:
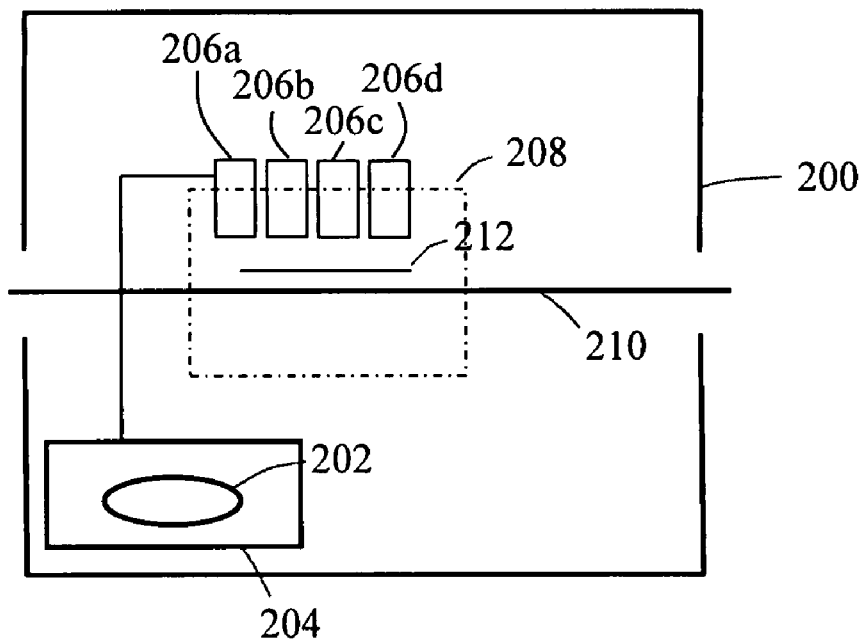
FIG. 5a is a block diagram of a banknote acceptance module according to another embodiment of the present invention.

Another embodiment of the present invention will now be described with reference to FIG. 5a, which is a block diagram of an improved banknote acceptance module 200.

The banknote acceptance module 200 is suitable for incorporation into an ATM, such as ATM 10 described above. Banknote acceptance modules are known to those of skill in the art, so many of the common features of a banknote acceptance module are not described in detail herein.

In this embodiment, instead of receiving data from multiple devices within an ATM 10, a statistical model 202 within a controller 204 in the banknote acceptance module 200 receives data from various sensors 206. These sensors 206 are located in proximity to a banknote interrogation zone 208 on a transport path 210. When a banknote 212 is transported to the banknote interrogation zone 208, its authenticity is then tested.

The sensors 206 include a magnetic sensor 206a for sensing a magnetic strip within a banknote, an imager 206b for capturing an image of a banknote, a fluorescence sensor 206c for detecting fluorescence from a banknote, and a capacitance sensor 206d for sensing the capacitance of a banknote. These sensors 206 are all known to those of skill in the art, and are typically used in validating the authenticity of a banknote.

In this embodiment, the output of each sensor 206 is measured for a genuine banknote and for each of a series of counterfeit banknotes. The outputs from each sensor 206a to 206d are then mapped to respective input zones 220a to 220d in the statistical model 202. The outputs of each sensor 206 are compared to create a base kernel for each sensor that indicates the measure of similarity between the outputs of all of the banknotes. This is shown in FIG. 5b, which is a diagram illustrating the main features of the statistical model 202.

Figure 5B:
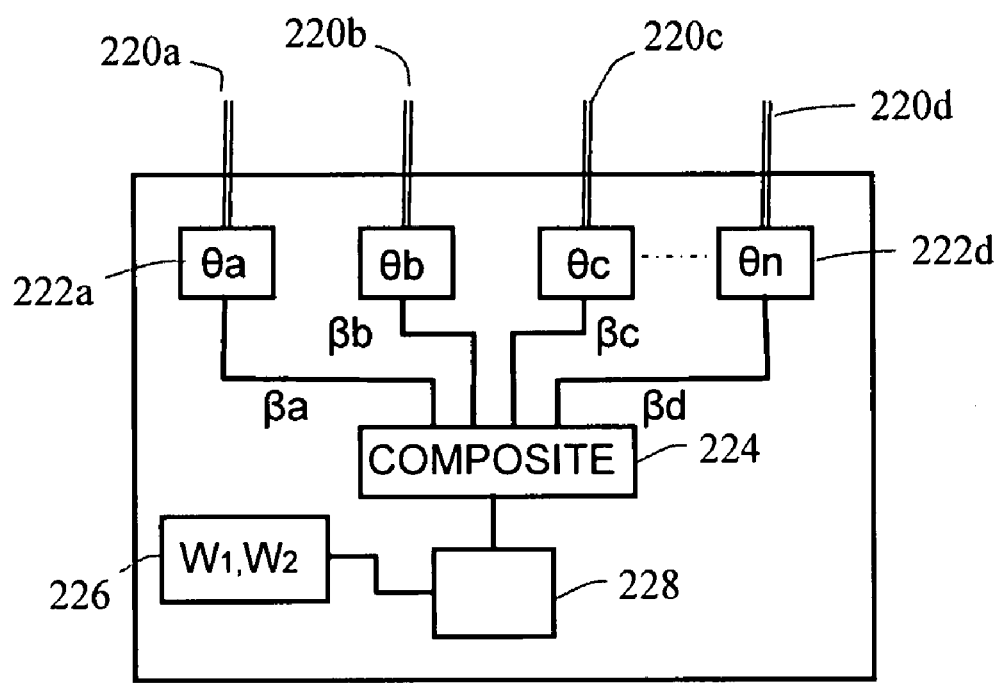

As shown in FIG. 5b, a base kernel is produced for each of the sensors 206. Thus, there is a magnetic base kernel 222a, an imager base kernel 222b, a fluorescence base kernel 222c, and a capacitance base kernel 222d.

These four base kernels 222 are combined (in a similar way to that described for the ATM embodiment above) to produce a composite kernel 224, where each of the base kernels 222 is individually weighted to indicate its relative importance in generating the overall classification.

The composite kernel 224 is then operated on by another function, in this example a regression kernel, illustrated by box 226. The regression kernel includes a unique regression parameter (W) for each row of the composite kernel. As only two classifications are used in this example (genuine and counterfeit), there are only two unique regression parameters. The regression kernel 226 is used to create an auxiliary variable (illustrated by box 228) that indicates the probability for each classification. In this embodiment, the first value represents the probability that the input data corresponds to a genuine banknote, and the second value represents the probability that the input data corresponds to a counterfeit banknote.

Once the statistical model has been trained, it can be used in the banknote acceptance module 200 to predict the probability that a banknote being tested is authentic.

By using kernels in the above embodiments a similarity metric is generated for pairs of inputs. As each kernel is dedicated to a particular modality, similar types of information are compared with each other, yielding a greater probability of a meaningful comparison.

Theoretical Considerations

To provide one of skill in the art with a full description of how to make a statistical model according to one embodiment of the present invention, two examples will now be given.

1 EXAMPLE 1

1.1 Introduction

In a large number of pattern recognition and machine learning problems we encounter the situation where different sources of information and different representations are available for the specific object that we are trying to model or classify. For example consider different representations of an image (i.e. pixel grey-scale values, gabor coefficients, fourier coefficients), different attributes of a signal or even more heterogeneous sources such as an image of a physical object, its response to specific radiation and the concentration of iron in its constitution. In these cases the underlying problem is how to combine all the available sources, in an informative way, in order to achieve a superior performance for the task in hand while at the same time dealing with the "curse of dimensionality" (Bellman, 1961; Bishop, 2006) inherited in the domain.

In the past, the problem for classification tasks has been addressed by employing ensemble learning methods (Dietterich, 2000) that first learn at a local level (i.e. in each separate source) and then proceed by meta-learning a global model (Wolpert, 1992) or making use of combination rules (Tax et al., 2000; Kittler et al., 1998) such as the product, sum, max or majority voting. Although these methods have been shown to improve on the performance of individual classifiers trained on the local level they suffer from certain drawbacks such as the computational cost of training multiple classifiers and the introduction of additional assumptions for their theoretical justification.

Instead of combining multiple classifiers trained on individual feature spaces, we propose to combine the feature spaces by embedding them into a composite kernel space and train a single kernel machine (Shawe-Taylor and Cristianini, 2004; Schölkopf and Smola, 2002; Girolami and Zhong, 2007). Previous work on kernel combination includes Lanckriet (2004) where semidefinite programming is used to learn the composite kernel matrix, Ong et al. (2005) where a hyperkernel space is defined on the space of kernels in order to learn the composite kernel within a specific parametric family, Lee et al. (2007) where Gaussian kernels under a Support Vector Machine (SVM) framework are combined into an expanded composite kernel, Pavlidis et al. (2001) in which the composite kernel is a summation of base kernels, without however learning the combinatorial weights or the kernel parameters and work by Girolami and Rogers (2005) where hierarchic Bayesian models are employed to infer the combinatorial weights and perform kernel learning.

Furthermore, in recent work by Lewis et al. (2006a) a nonstationary kernel combination approach was presented which allows for variation on the relative weights of the base kernels among the input examples. In this case the kernel combination weights are a function of the input.

In this paper we present, a formal and explicit way for multiclass classification on a composite kernel framework without resorting to ad hoc combinations of binary classifiers as in the aforementioned past work within the SVM methodology. We extend and improve the method proposed in Girolami and Rogers (2005) by considering a multinomial probit likelihood that enables us to adopt an efficient Gibbs sampling framework through the introduction of latent/auxiliary variables as demonstrated in the seminal paper by Albert and Chib (1993) and further extended by Holmes and Held (2006). This enables us to retain the efficient hierarchical Bayesian structure of our model and provides us with an elegant solution for the multiclass setting.

Furthermore, we provide alternative variations for the multinomial probit model with a weighted, binary, fixed, or product combination of kernels and perform an explicit comparison between the kernel combination methods and ensembles of classifiers. In summary, our method has the following advantages over previous approaches:

Fully Bayesian model supported by statistical learning theory. Probabilistic output predictions.

Explicit multiclass classifier not a combination of binary classifiers.

The composite kernel retains the dimensionality of the contributing kernels, in contrast with Lee et al. (2007).

Allows for learning to be performed at three levels (regressors, importance of information channels, parameters of kernels), within the training of the classifier.

General framework for combining different sources of information, not dependent on the use of kernels and on a specific kernel type.

The paper is organized as follows. In the following section we introduce our models for composite kernel regression together with the relevant theory and motivation behind them. Further on, we briefly introduce various combinatorial methods employed in the past for ensemble learning and we move on to describe the experiments conducted and the reported results. Finally, we discuss the merits of our approach in comparison with employing ensembles of classifiers and propose future topics to be researched.

1.2 The Composite Kernel Model

Consider S sources of information; From each one we have input variables $x_n^s$ as $D^s$—dimensional vectors (the superscripts denote "function of" unless otherwise specified. Matrices are denoted by M, vectors by m and scalars by m.) for s=1, ..., S and corresponding real-valued target variables $t_n \in \{1, ..., C\}$ for n=1, ..., N where N is the number of observations and C the number of classes. By applying the kernel trick on the individual feature spaces created by the S sources we can define the N×N composite kernel as $$K^{\beta\Theta} = \sum_{s=1}^{S} \beta_s K^{s\theta_s}$$

with each element analysed as $$K^{\beta\Theta}(x_i, x_j) = \sum_{s=1}^{S} \beta_s K^{s\theta_s}(X_i^s, X_j^s)$$

where $\beta$ is an S×1 column vector and $\Theta$ is an S×$D^s$ matrix, describing the $D^s$-dimensional kernel parameters $\theta_s$ of all the base kernels $K^s$. Now as we can see the composite kernel is a weighted summation (we present the more general kernel combination method of weighted summation first as our baseline approach.) of the base kernels with $\beta_s$ as the corresponding weight for each one. In the case where instead of kernels we employ the original feature spaces or expansions of them (consider for example polynomial expansions.), we would still define the composite feature space as a weighted summation of the individual ones and proceed in a similar manner as below, with the appropriate dimensions for the corresponding sub-sets of regressors.

Following the standard approach for the multinomial probit by Albert and Chib (1993) we introduce auxiliary variables $Y \in R^{C \times N}$ and define the relationship between the auxiliary variable $y_{cn}$ and the target variable $t_n$ as $$t_n = i \text{ if } y_{in} > y_{jn} \forall j \neq i \quad (1)$$

Now, the model response regressing on the variable $y_{cn}$ with model parameters $W \in R^{C \times N}$ and assuming a standardised normal noise model as in Albert and Chib (1993); Girolami and Rogers (2006) is given by $$y_{cn} | w_c, k_n^{\beta\Theta} \sim N_{y_{cn}}(w_c K_n^{\beta\Theta}, 1) \quad (2)$$

where $N_\chi(m, v)$ denotes the normal distribution of $\chi$ with mean m and scale v, W and Y are C×N matrices, $w_c$ is a 1×N row vector and $k_n^{\beta\Theta}$ is an N×1 column vector from the $n^{th}$ column of the composite kernel $K^{\beta\Theta}$. Hence now, the likelihood, can be expressed as the following by simply marginalizing over the auxiliary variable $y_n$ and making use of relations 1 and 2:

$$P(t_n = i | W, k_n^{\beta\Theta}) = \int P(t_n = i | y_n) P(y_n | W, k_n^{\beta\Theta}) dy_n = \quad (3)$$

$$\int \delta(y_{in} > y_{jn} \forall j \neq i) \prod_{c=1}^{C} N_{y_{cn}}(w_c k_n^{\beta\Theta}, 1) dy_n =$$

$$\varepsilon_{p(u)} \left\{ \prod_{j \neq i} \Phi(u + (w_i - w_j) k_n^{\beta\Theta}) \right\}$$

where the expectation $\epsilon$ is taken with respect to the standardised normal distribution p(u)=N(0, 1). Hence, we can easily calculate the likelihood by averaging the quantity inside the expectation for a certain number of random samples (typically 1000 samples have been employed which has been sufficient to approximate the expectation to a high degree of accuracy.) of u.

1.2.1 The Model

Now we consider the prior distributions to be placed on the model parameters W and β. The regressors W are defined typically as a product of zero-mean Gaussians with scale ζ and a hyper-prior inverse-Gamma distribution is placed on each scale with hyper-hyper-parameters τ and ν. This reflects our lack of prior knowledge for the parameters and allows the scales of the distributions to be inferred from the problem. For the general model depicted in FIG. 6, the prior distribution on the combinatorial weights β is a Dirichlet distribution with parameters ρ and a hyper-prior inverse-Gamma distribution is placed on ρ with hyper-hyper-parameters μ and λ.

The choice of the Dirichlet distribution, which confines our movement on a simplex, for the combinatorial weights β is made on the basis of previous work by Girolami and Rogers (2005) where it was shown to be a necessary condition to avoid unconstrained growth or reduction of the model parameters due to their inherent coupling. The hyper-prior inverse-Gamma distributions are justified on the basis of conjugation for the model parameters leading to a closed-form posterior distribution (Berger, 1985; Denison et al., 2002) and also on the restriction that certain parameters, such as the variance ζ, are defined on $\Re^+$.

Furthermore, the model allows for inference on the base kernel parameters θ by placing an inverse-Gamma distribution with hyper-parameters ω and φ. The kernel parameters are specific to the kernel (or feature expansion) employed to describe one source of information and can vary from the variance of Gaussian kernels to the parameters of a polynomial or linear kernel. The specific prior distribution employed here reflects again the restriction imposed from the variance which is defined on $\Re^+$.

The corresponding prior and hyper-prior distributions (with superscripts denoting powers as usual.):

$$p(W | \zeta) = \prod_{c=1}^{C} \prod_{n=1}^{N} N_{w_{cn}}(0, \zeta_{cn})$$

$$p(\zeta | v, \tau) = \prod_{c=1}^{C} \prod_{n=1}^{N} \frac{\tau^v}{\Gamma(v)} (\zeta_{cn}^{-1})^{v-1} \exp(-\tau \zeta^{-1})$$

$$p(\Theta | \phi, \omega) = \prod_{s=1}^{S} \prod_{d=1}^{D} \frac{\phi^\omega}{\Gamma(\omega)} (\theta_{sd})^{\omega-1} \exp(-\phi \theta_{sd})$$

$$p(\beta|\rho) = \frac{\Gamma\left(\sum_{i=1}^{S}\rho_i\right)}{\prod_{i=1}^{S}\Gamma(\rho_i)}\prod_{i=1}^{S}\beta_i^{\rho_i-1}$$

$$p(\rho|\lambda,\mu) = \prod_{s=1}^{S}\frac{\mu^\lambda}{\Gamma(\lambda)}(\rho_s)^{\lambda-1}\exp(-\mu\rho_s)$$

Finally, the hyper-hyper-parameters of the model can be either set by maximum likelihood estimation or can be fixed to values reflecting lack of prior information, by defining uninformative hyper-prior and prior distributions.

Note that we place an inverse-Gamma distribution on the inverse of the scale, i.e. on $\zeta^{-1}$, instead of directly on the scale. This simply allows us to obtain a closed-form posterior distribution on the scale, avoiding any unecessary complexities.

1.2.2 Posterior Inference

Inference on the model parameters is performed via Bayes rule in order to obtain the posterior distributions. We present here the resulting posterior distributions which are adoptions, for our problem, of standard results in the statistics literature, for a full treatment see Denison et al. (2002); Hastie et al. (2001). The conditional posterior distribution for the regression parameters $p(W|Y, K^{\beta\Theta}, \zeta) \propto p(Y|W, K^{\beta\Theta}) p(W|\zeta)$ is a product of Gaussian distributions $$\prod_{c=1}^{C} \mathcal{N}_{w_c}(m_c, V_c) \text{ where}$$

$$m_c = V_c(K^{\beta\Theta} y_c^T) \text{ and } V_c = (K^{\beta\Theta} K^{\beta\Theta} + Z_c^{-1})^{-1}$$

$Z_c$ is a diagonal matrix with $\zeta_c$ in the main diagonal and $y_c$ is an $1 \times N$ vector of the auxiliary variables for a specific class c. The posterior $p(Y|W, K^{\beta\Theta}, t) \propto p(t|Y) p(Y|W, K^{\beta\Theta})$ over the auxiliary variables is a product of N C-dimensional conically truncated Gaussians given by $$\prod_{n=1}^{N} \delta(y_{in} > y_{jn} \forall j \neq i) \delta(t_n = i) \mathcal{N}_{y_n}(Wk_n^{\beta\Theta}, 1)$$

Furthermore, the posterior distribution $p(\zeta|W, \tau, \nu) \propto p(W|\zeta) p(\zeta|\tau, \nu)$ over the variances $\zeta$ is of the same form as the prior with updated parameters $$\tau^* = \tau + \frac{1}{2} \text{ and } \nu^* = \nu + \frac{1}{2}w_{cn}^2$$

and finally the combinatorial weights $\beta$, the associated hyper-parameter $\rho$ and the base kernel parameters $\Theta$ are inferred via three Metropolis-Hastings (Hastings, 1970), MH hereafter, subsamplers with acceptance ratios:

$$A(\beta^i, \beta^*) = \min\left(1, \frac{\prod_{c=1}^{C}\prod_{n=1}^{N}\mathcal{N}_{y_{cn}}(w_c k_n^{\beta*\Theta}, 1)\prod_{s=1}^{S}\beta_s^{*\rho_s-1}}{\prod_{c=1}^{C}\prod_{n=1}^{N}\mathcal{N}_{y_{cn}}(w_c k_n^{\beta^i\Theta}, 1)\prod_{s=1}^{S}\beta_s^{i\rho_s-1}}\right)$$

$$A(\rho^i, \rho^*) = \min\left(1, \frac{\Phi(\rho^*)\prod_{s=1}^{S}\beta_s^{\rho_s^*-1}\prod_{s=1}^{S}\rho_s^{*\mu-1}e^{-\lambda\rho_s^*}}{\Phi(\rho^i)\prod_{s=1}^{S}\beta_s^{\rho_s^i-1}\prod_{s=1}^{S}\rho_s^{i\mu-1}e^{-\lambda\rho_s^i}}\right)$$

$$A(\Theta^i, \Theta^*) = \min\left(1, \frac{\prod_{s=1}^{S}\prod_{d=1}^{D}\theta_{sd}^*\prod_{c=1}^{C}\prod_{n=1}^{N}\mathcal{N}_{y_{cn}}(w_c k_n^{\beta\Theta^*}, 1)\theta_{sd}^{*w-1}e^{-\phi\theta_{sd}^*}}{\prod_{s=1}^{S}\prod_{d=1}^{D}\theta_{sd}^i\prod_{c=1}^{C}\prod_{n=1}^{N}\mathcal{N}_{y_{cn}}(w_c k_n^{\beta\Theta^i}, 1)\theta_{sd}^{iw-1}e^{-\phi\theta_{sd}^i}}\right)$$

$$\text{where } \Phi(\rho) = \frac{\Gamma\left(\sum_{s=1}^{S}\rho_s\right)}{\prod_{s=1}^{S}\Gamma(\rho_s)}$$

with the proposed move symbolised by * and the current state with i.

The MH subsamplers only need to sample once every step as the main Gibbs sampler, which always accepts the proposed move, will lead them towards convergence.

1.2.3 Learning the Combination

Figure 6:
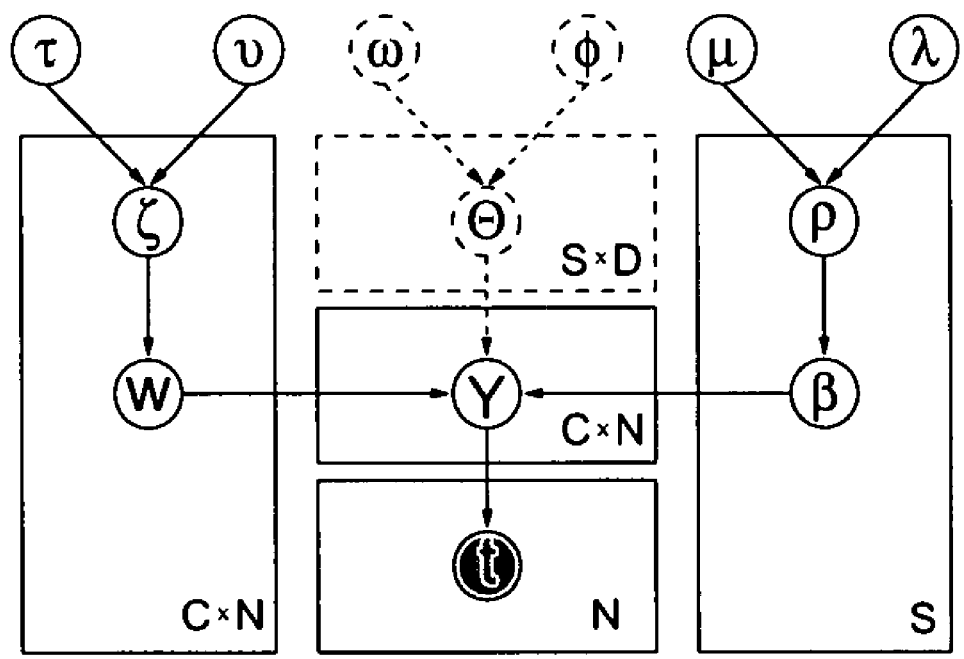
FIG. 6 is a diagram showing a hierarchical Bayesian classification model for combining kernels suitable for use with the embodiments of FIGS. 1 and 5.

Learning the composite kernel can be performed on two levels. First we can learn the combinatorial parameters $\beta$ and secondly we can learn the parameters $\Theta$ of the kernel functions making up the base kernels. The model, as depicted in FIG. 6 accounts for both levels of learning by embedding three MH subsamplers (one extra for learning the hyper-parameters $\rho$) within the main Gibbs sampler. In this paper we demonstrate the full model on an artificial dataset, and in the main benchmark experiments we focus on learning the combinatorial weights by conditioning on specific kernel parameters $\Theta$ and hence needing only two subsamplers for inference on $\beta$ and the hyperparameters $\rho$.

So far, we have presented our model with a composite kernel constructed by a weighted summation of base kernels which is learnt by a MH subsampler. In this section we modify the model to examine three other possible combination strategies, namely a fixed summation, a binary summation and a product combination. Summarising the four methods presented in this paper with respect to the combinatorial weights $\beta$ and the base kernels $K^s$ we have:

Fixed(FixC): $\sum_{s=1}^{S}\beta_s = 1$ for $\beta_s = \frac{1}{S} \forall s$

Binary(BiC): $\beta_s \in \{0, 1\} \forall s$

Weighted(WeC): $\sum_{s=1}^{S}\beta_s = 1$ and $\beta_s \geq 0 \forall s$

-continued $$\text{Product}(ProdC): K^{\Theta}(x_i, x_j) = \prod_{s=1}^{S} K^{s\theta_s}(x_i^s, x_j^s)$$

The fixed combination method is the obvious case were the base kernels are equally weighted and summed up together. In this case our model, as depicted in FIG. 6, simplifies by dropping the S plate and becomes less computationally intensive since the MH subsamplers are no longer needed. However, this means that we lose the ability to infer the importance of the sources and hence our insight into the problem.

In the case of the binary combination method, $\beta$ becomes a binary vector switching base kernels on or off. The approach has been motivated by the work of Holmes and Held (2006) on covariate set uncertainty where they employed a MH subsampler to learn a binary covariate indicator vector switching features on or off. We modify the approach, as a kernel set uncertainty by infering the binary vector with an extra Gibbs step that depends on the conditional distribution of the auxiliary variable Y given $\beta$ and marginalised over the model parameters W.

The prior distribution over $\beta$ is now a binomial distribution $$\beta \sim \prod_{s=1}^{S} Bi(\sigma_s)$$

with $\sigma_s=0.5$ reflecting our lack of prior knowledge. The conditional distribution which is the extra Gibbs step introduced, here for switching off kernels, $p(\beta_i=0|\beta_{-i}, Y, K^{s\theta_s} \forall s \in \{1, \ldots, S\})$ is given by $$\frac{p(Y|\beta_i=0, \beta_{-i}, K^{s\theta_s} \forall s \in \{1, \ldots, S\},)p(\beta_i=0|\beta_{-i})}{\sum_{j=0}^{1} p(Y|\beta_i=j, \beta_{-i}, K^{s\theta_s} \forall s \in \{1, \ldots, S\},)p(\beta_i=j|\beta_{-i})}$$

where $K^{s\theta_s} \forall s \in \{1, \ldots, S\}$ are all the base kernels. The case for switching on kernels follows logically from the above.

Finally, the marginal likelihood term that the Gibbs step depends on, $p(Y|\beta, K^{s\theta_s} \forall s \in \{1, \ldots, S\})$ is derived, based on standard procedures from the literature (Denison et al., 2002), as $$\prod_{c=1}^{C} (2\pi)^{-\frac{N}{2}} |\Omega_c|^{-\frac{1}{2}} \exp\left\{-\frac{1}{2} y_c \Omega_c y_c^T\right\}$$

where $\Omega_c = I + K^{\beta\Theta} Z_c^{-1} K^{\beta\Theta}$

The product combination method is fundamentally different from the rest approaches. The base kernels are no longer added together in a specific way but instead multiplied element-wise. There is no longer the need for combinatorial weights $\beta$, which means that our model simplifies by droping the S plate in FIG. 6 but again it loses the ability to infer the significance of the sources.

1.2.4 Predictive Distribution

Having described the class likelihood in Eq. 3 and the posterior inference of our model, we return to the original problem of predicting the class label $t_*$ of a new point $x_*$. The predictive distribution is given by $$P(t_*=i|x_*) = \int P(t_*=i|W, k_*^{\beta\Theta}) P(W, \beta, \Theta | X, t) dW d\beta d\Theta$$

where $k_*^{\beta\Theta}$ is the composite test kernel created based on $x_*$ and the inferred values for $\beta, \Theta$. The training set X, t is used to infer the model parameters as described in the previous sections.

The Monte Carlo estimate of the predictive distribution is used to assign the class probabilities according to a number of samples (in fact the number of samples equals the number of Gibbs steps minus some burn-in period. This is because in every Gibbs iteration we eplore the parameter space of W, $\Theta$, $\beta$ and then we simply average over these parametrically-different models) L drawn from the predictive distribution $$P(t_*=i|x_*) = \frac{1}{L} \sum_{l=1}^{L} P(t_*=i|W^l, k_*^{\beta^l\Theta^l})$$

which, considering Eq. 3 and substituting for the test composite kernel $K_*^{\beta\Theta}$ completes our model and defines the estimate of the predictive distribution as $$P(t_*=i|x_*) = \frac{1}{L} \sum_{l=1}^{L} \varepsilon_{p(u)} \left\{ \prod_{j \neq i} \Phi\left(u + (w_i^l - w_j^l) k_*^{\beta^l\Theta^l}\right) \right\}$$

1.3 Combining Classifiers

We now briefly review common rules for combining classifiers, see Dietterich (2000); Kittler et al. (1998); Tax et al. (2000) for more details. Only the product combination rule has a solid Bayesian foundation as it can be derived under the assumption of independent feature spaces whereas the sum rule requires an additional assumption of small posterior deviation from the prior probabilities. The most common rules are the following Summation Rule (Sum): A simple average of the posteriors over classes.

$$P(t_n=j|D) = \frac{1}{S} \sum_{s=1}^{S} P(t_n=j|D_s)$$

Product Rule (Prod): A normalised product of the posteriors over classes.

$$P(t_n=j|D) = \frac{\prod_{s=1}^{S} P(t_n=j|D_s)}{\sum_{c=1}^{C} \prod_{s=1}^{S} P(t_n=c|D_s)}$$

Max Rule (Max): Select the class that has the maximum posterior probability over the S classifiers.

$$t_n = \max_{s=1}^{S} P(t_n|D_s)$$

Majority vote Rule (Maj): Select the class that is predicted by the majority of the S classifiers.

$$t_n = \underset{s=1}{\overset{S}{maj}} P(t_n | D_s)$$

The combinatorial methods of classifiers described above suffer from well known, in the statistics literature, problems as the assumptions that they are based on are rarely satisfied. Specifically, the independence assumption is very strong since rarely the various sources we use are completely independent as they have been generated, in most cases, by correlated procedures. For further discussion on the matter see Berger (1985).

1.4 Experiments

We present the performance and results of our model in both an artificial and a benchmark dataset. Throughout the experimental study we emply Gaussian (radial basis) kernels for describing the feature spaces whith each element in a base kernel defined as $$K_{ij}^{s\theta_s} = K^{s\theta_s}(x_i^s, x_j^s) = \exp[-(x_i^s - x_j^s)^T \Lambda^s (x_i^s - x_j^s)]$$

where $\Lambda^s$ is a $D^s \times D^s$ diagonal matrix with $\theta_s$ as the elements in the diagonal. For the most part of our experimental study we condition our model on specific kernel parameters $\theta_{sd} = 1/D^s$ unless otherwise specified.

1.4.1 Artificial Dataset

Figure 7:
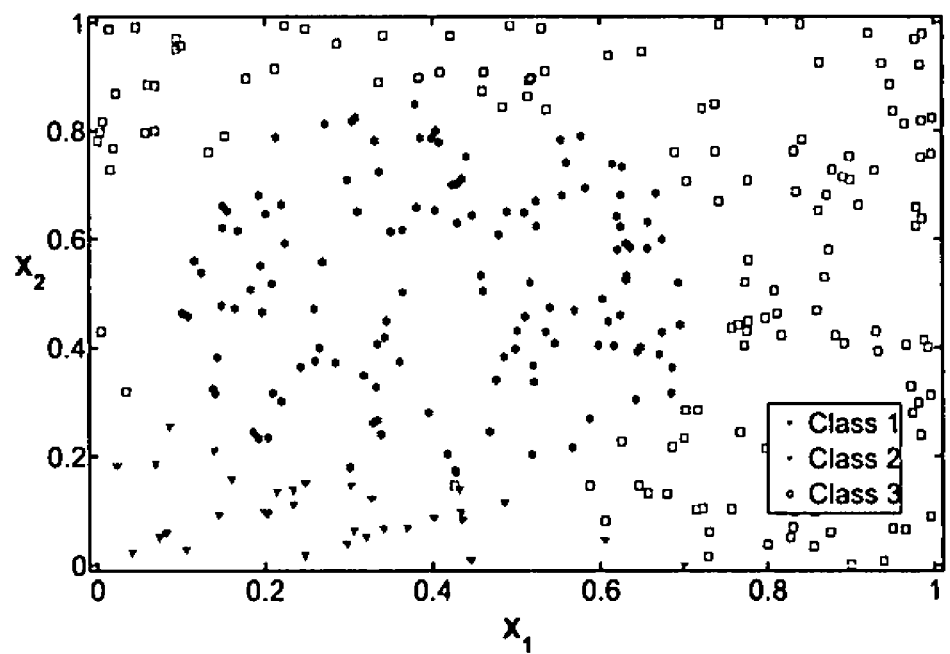
FIG. 7 is a graph illustrating results obtained using two informative dimensions of a dataset.

First, we illustrate the benefits of the proposed method, with the weighted combination instance, on an artificial dataset that is based on the one introduced by Neal (1998). The original dataset consists of N 4-dimensional objects that were generated by defining an elipse of the form $$\alpha > x_1^2 + x_2^2 > \beta$$

with the first two dimensions, while adding noise with the other two dimensions (uninformative features). In FIG. 7 the dataset is partially depicted using only the informative features. We extend that dataset by considering two additional noise kernels, with varying informational content, arid infer via the MH subsamplers for $\Theta$ and $\beta$ both the importance of the individual features and the importance of the kernels, successfully learning the composite kernel as it will be made clear.

Figure 8:
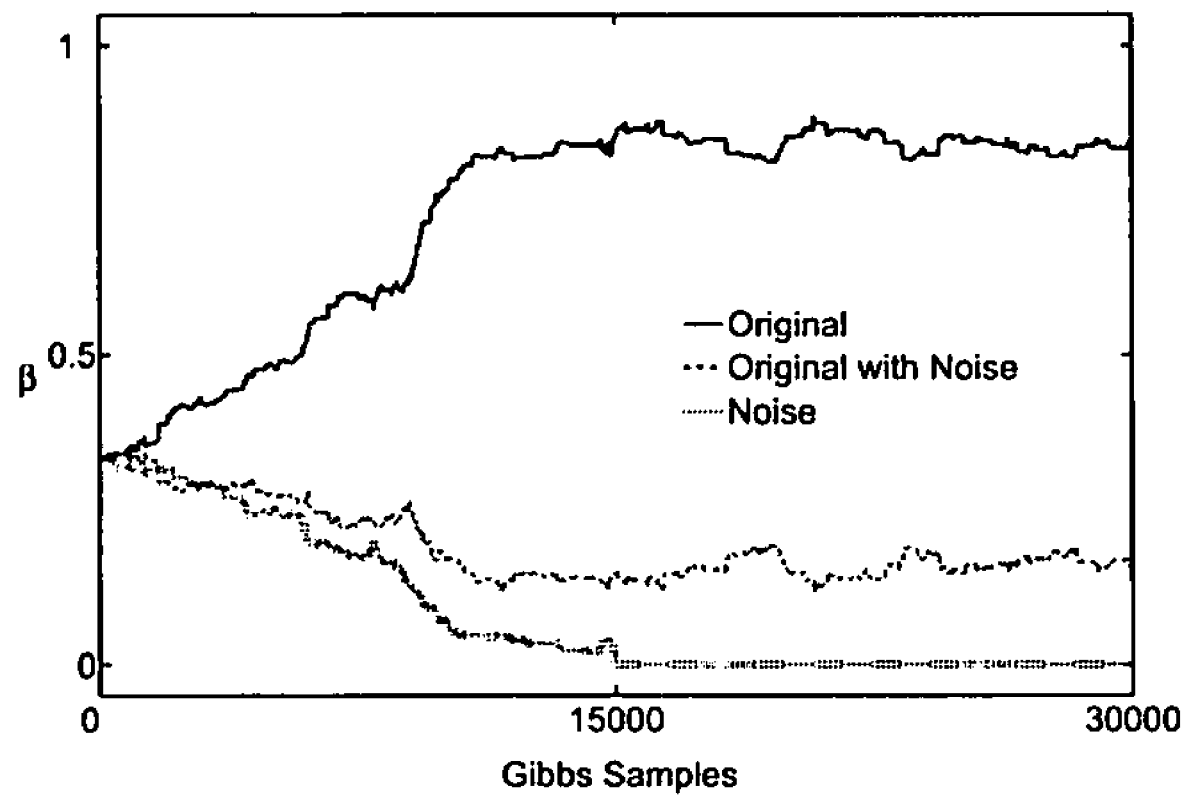
FIG. 8 is a graph illustrating three combined sources with varying informational content.

In FIG. 8 the results are depicted for the case of having three sources of information with varying informational content. We consider the original kernel which is created from the dataset, a less informative kernel which is the original dataset with added noise included and finally a completely uninformative kernel which is only noise. The model correctly identifies the importance of the kernels and learns to assign appropriate weights to them, effectively discarding the noise kernel.

Figure 9A:
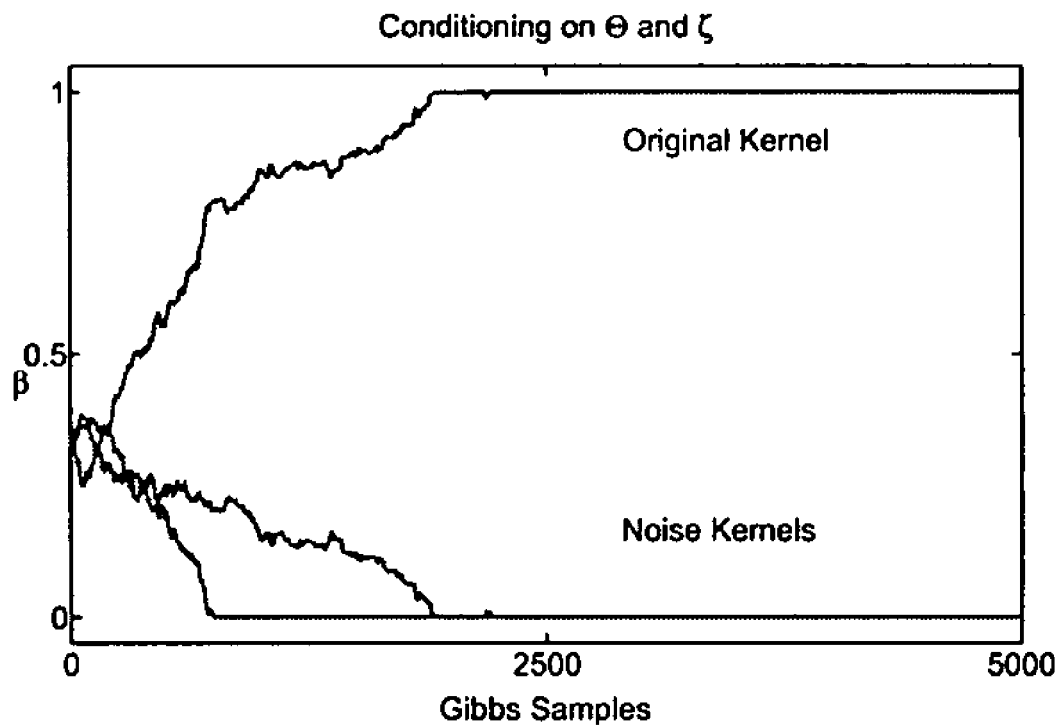
FIGS. 9a and 9b are graphs illustrating the effect of conditioning on the dataset of FIG. 7.
Figure 9B:
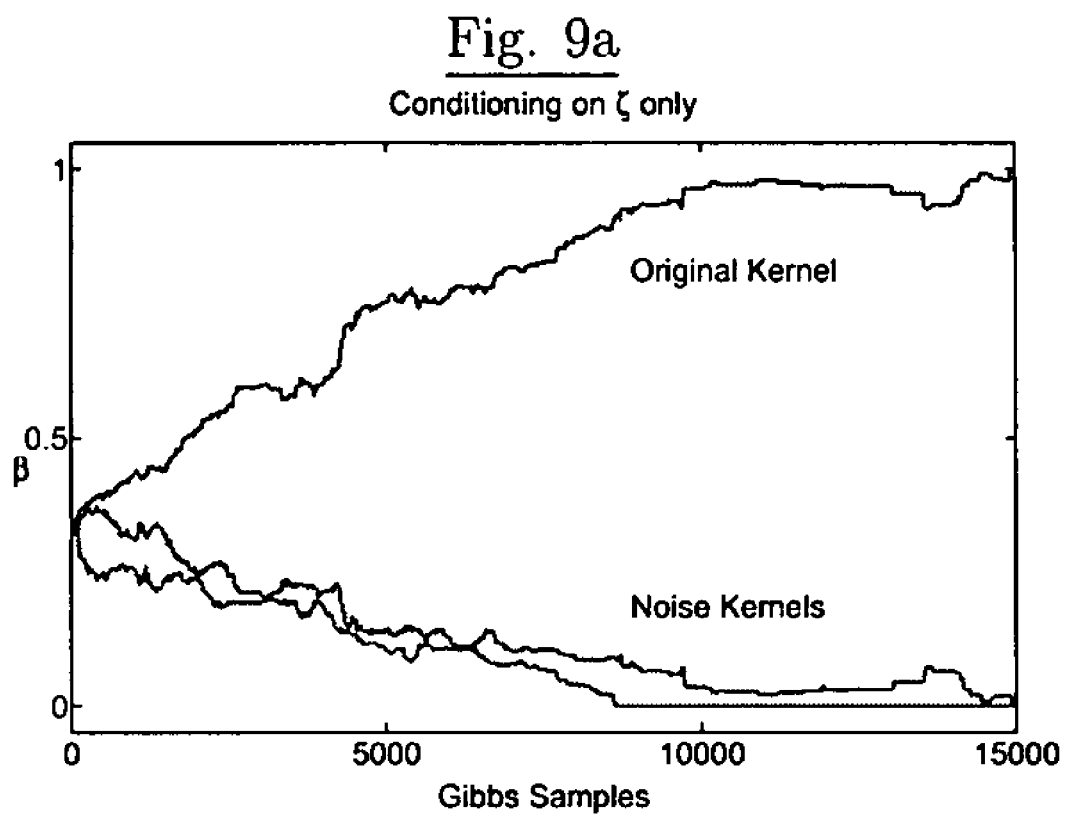

The results for the case of the weighted combination model with two noise kernels and one informative, and the sub-cases of conditioning on either only the prior variance, by setting $\zeta=1$, or on both $\zeta$ and the feature weights $\Theta$, are depicted in FIG. 9 and show the increase of the needed Gibbs samples for convergence as the parameter space expands.

Figure 10:
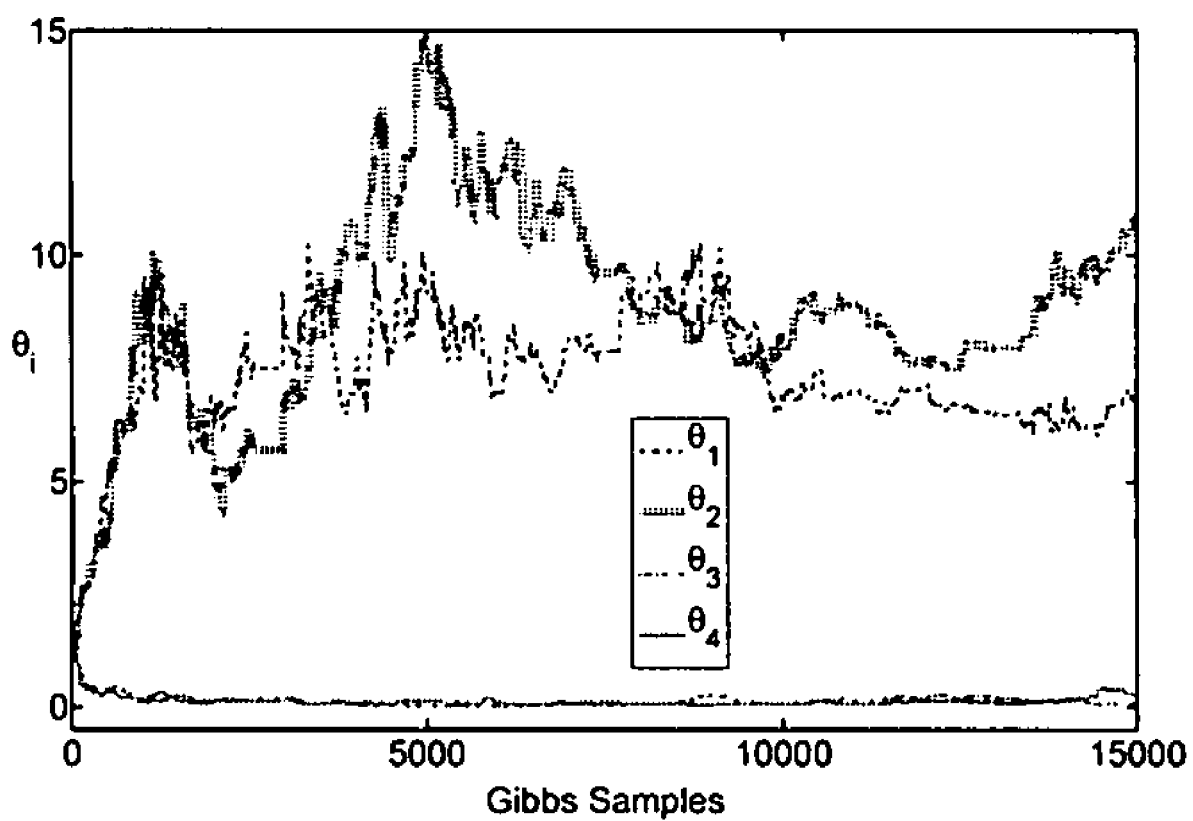
FIG. 10 is a graph illustrating different parameter values for a classifier suitable for use with the embodiments of FIGS. 1 and 5.
Figure 11A:
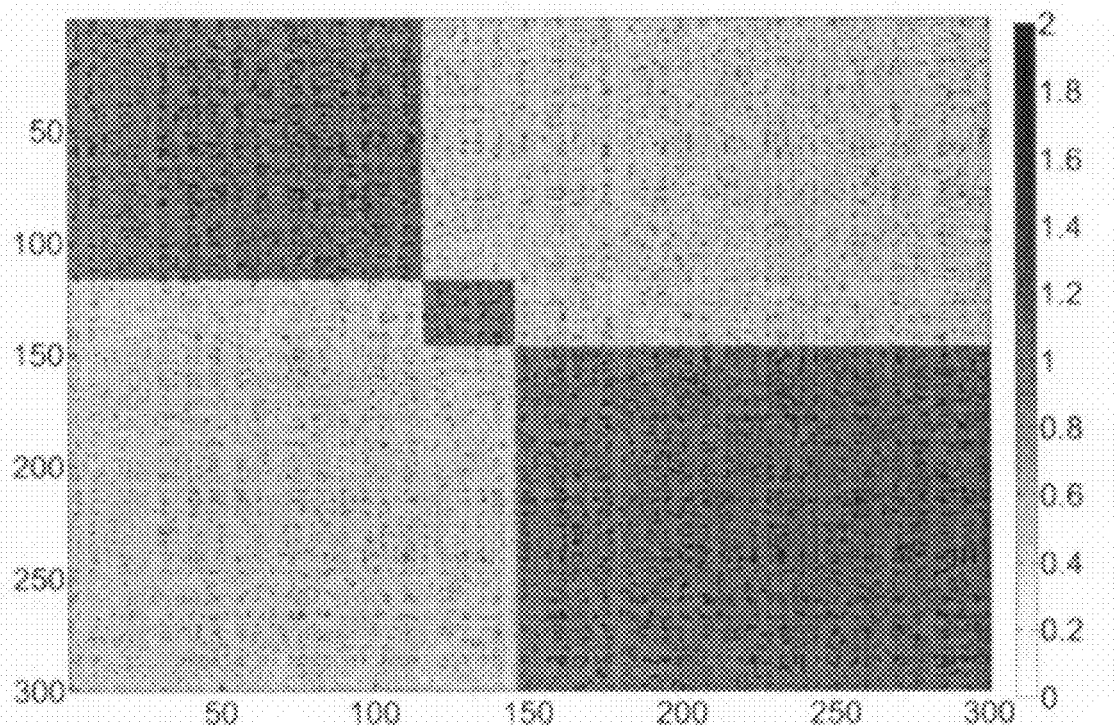
FIGS. 11a and 11b illustrate an improvement in the feature space as a result of the statistical model illustrated in FIG. 6.
Figure 11B:
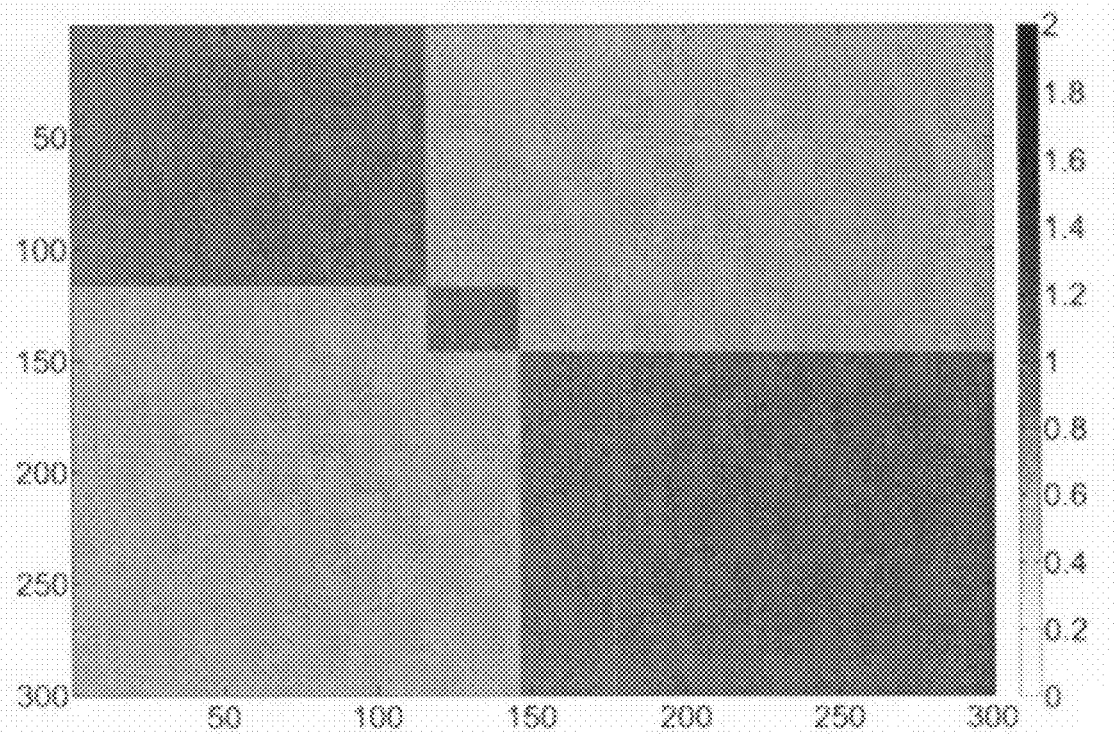

As we have described, the model also allows to infer knowledge on the importance of specific features by learning the kernel parameters $\Theta$. In FIG. 10 the parameter values of the informative base kernel are depicted and with final values of $\theta_i = [6.84\ 10.94\ 0.10\ 0.26]$ the model correctly disregards the two uninformative features (the corresponding $\chi_3$ and $\chi_4$ dimension) and also identifies $\chi_2$ as the most important dimension, which is in agreement with our intuition considering the dataset in FIG. 7. Hence now, the composite kernel is successfully learnt on both levels, identifying the important kernel and also the important features. This effectively leads to a "clean up" of the composite kernel as it is shown in FIG. 11.

1.4.2 Benchmark Dataset

The main experimental work reported is on the multiclass "Multiple Features" dataset from the UCI repository (Newman et al., 1998) which consists of features of 2000 handwritten numerals from 0 to 9 (10 classes with 200 examples each). Four different feature sets are considered in accordance with past work (Tax et al., 2000), namely the Fourier descriptors (FR), the Karhunen-Loéve features (KL), the pixel averages (PX) and the Zernike moments (ZM). In contrast with Tax et al. (2000) we do not restrict the (ZM) features to 9 classes and allow the rotation invariance property to introduce further problems in the distinction between digits 6 and 9.

All the experiments are repeated over 50 trials in order to report statistical properties and for each trial we randomly select 20 training points and 20 test points from each class resulting in a training set of size 200 that the classifier is trained on for 5,000 Gibbs samples. In each trial we train individual classifiers on each set and all four kernel combination methods. In all cases we employ Gaussian kernels with fixed parameters $\theta_{sd} = 1/D_s$ and the hyper-hyper-parameters are set to a value of 1 reflecting lack of prior knowledge. It is worth noting that due to the nature of the base kernels, the product combination rule corresponds to an overall kernel of all feature sets.

In FIG. 12 the comparison over 50 trials is depicted. As it can be seen the kernel combination methods improve significantly on any individual classifier and on the max and majority voting combination schemes. Furthermore, they match the performance of the product and sum rules with no statistical difference. The max and majority rules fail to improve on the best individual classifier.

It is also worth noting that the product combination of base kernels is performing well matching both the rest kernel combination methods and the best classifier combinations. In Table 1 the results from a statistical significance t-test between the methods confirms our claims and the mean and standard deviation of the performance for each method is shown in Table 2.

The combinatorial weights β for the weighted combination method can give us an insight into the relative importance of base kernels and furthermore indicate which sources complement each other and are selected to be combined. The mean values at the end of the Gibbs sampling over 50 trials,

TABLE 1

Two-sample t-test of the null hypothesis that the mean of the distributions are equal. Statistical significance at the 5% level.

| Methods    | p-value    | Hypothesis |
|------------|------------|------------|
| PX-FixC    | 3.1055e-05 | Rejected   |
| PX-BinC    | 1.4038e-04 | Rejected   |
| PX-WeC     | 0.0010     | Rejected   |
| PX-Prod    | 1.5090e-07 | Rejected   |
| PX-ProdC   | 4.0773e-07 | Rejected   |
| Prod-FixC  | 0.2781     | Supported  |
| Prod-BinC  | 0.1496     | Supported  |
| Prod-WeC   | 0.0727     | Supported  |
| Prod-ProdC | 0.9109     | Supported  |

TABLE 2

Performance measures for all the methods.

| Method | μ ± σ | Method | μ ± σ |
|---|---|---|---|
| FR | 27.27 ± 3.35 | Max | 8.36 ± 2.32 |
| KL | 11.06 ± 2.30 | Maj | 8.45 ± 2.28 |
| PX | 7.24 ± 1.98 | BinC | 5.67 ± 1.98 |
| ZM | 25.17 ± 3.00 | FixC | 5.53 ± 1.93 |
| Prod | 5.13 ± 1.74 | WeC | 5.84 ± 2.16 |
| Sum | 5.27 ± 1.93 | ProdC | 5.17 ± 1.83 | see Table 3, show that the pixel kernel is the most important one by far as expected. This is in agreement with the comparative performance of the individual classifiers. However, the Karhunen-Loéve kernel receives on average the lowest weight although it is the second best individual classifier and the Fourier kernel is weighted as more important for the combination. This is possibly due to lack of information diversity between the Pixel and the KL source. The underlying phenomenon is also depicted in the work of Tax et al. (2000) where the performance reported is better by removing the Karhunen-Loéve classifier than by removing the Fourier one from the combination of classifiers.

TABLE 3

Average combinatorial weights over 50 trials.

| | FR | KL | PX | ZM |
|---|---|---|---|---|
| $\beta_i$ | 0.1837 | 0.0222 | 0.6431 | 0.1511 |

1.5 Discussion and Conclusions

In this paper we have presented a composite kernel regression method employing the multinomial probit likelihood which gives rise to an efficient Gibbs sampling algorithm. We examined different ways of combining the kernels within this framework by considering a weighted summation of base kernels that is achieved via a Metropolis subsampler, a binary summation by introducing an additional Gibbs step, a baseline of fixed combinatorial weights and finally a product combination of base kernels.

The goal of this work was to propose and examine alternative ways of combining possibly heterogeneous sources of information than the computationally expensive approach of independent classifier combination. An explicit comparison between the two strategies was reported and it was shown that a combination of feature spaces and hence sources of information is as good as the best combination of individual classifiers without the costs of operating multiple classifiers.

In detail, it was shown that the proposed kernel combination methods improve significantly on the best performing individual classifier and match the best combination of classifiers with no statistical difference in performance. Furthermore, when employing a weighted combination of base kernels we can make inferences about the relative importance of these sources for the classification performance. Although the KL individual classifier is performing much better than the FR one, the latter is more important for the overall task as it carries complementary information for the combination. It seems that the Pixel and KL features offer little complementary information between them, allowing the latter to be disregarded from the combination.

Furthermore, from the four methods of combining base kernels, the product combination and the fixed summation rule do not allow inference on the importance of the contributing sources to be performed since the S plate from our model is dropped and there is no associated weight to be learnt. Contrary, for the weighted and binary methods we can perform learning of the composite kernel on two levels by employing MH subsamplers for both the base kernels parameters and the combinatorial weights.

Finally, non-parametric kernels can be employed with all our methods, droping the need for the additional subsampler and hence reducing computational cost. We consider, as the next future step, to provide a Variational Bayes approximation which can be readily derived for the composite kernel regression model.

2 EXAMPLE 2

In this example we offer a variational Bayes approximation on the multi-nomial probit model for kernel combination. Our model is well-founded within a hierarchical Bayesian framework and is able to instructively combine available sources of information for multinomial classification. The proposed framework enables informative integration of possibly heterogeneous sources in a multitude of ways, from the simple summation of feature expansions to weighted product of kernels, and it is shown to match and in certain cases outperform the well-known ensemble learning approaches of combining individual classifiers. At the same time the approximation reduces considerably the CPU time and resources required with respect to both the ensemble learning methods and the full Markov chain Monte Carlo, Metropolis-Hastings within Gibbs solution of our model. We present our proposed framework together with extensive experimental studies on synthetic and benchmark datasets and also for the first time report a comparison between summation and product of individual kernels as possible different methods for constructing the composite kernel matrix.

2.1 Introduction

Classification has been an active research field within the pattern recognition and machine learning communities for a number of decades. The interest comes from the nature of the problems encountered within the communities, a large number of which can be expressed as clustering or classification tasks, i.e. to be able to learn and/or predict in which category an object belongs. In the supervised and semi-supervised learning setting, (MacKay, 2003; Bishop, 2006), where labeled (or partially labeled) training sets are available in order to predict labels for unseen objects, we are in the classification domain and in the unsupervised learning case, where the machine is asked to learn categories from the available unlabeled data, we fall in the domain of clustering.

In both of these domains a re-occuring theme is how to utilize constructively all the information that is available for the specific problem in hand. This is specifically true when large number of features from different sources are available for the same object and there is no a priori knowledge of their significance and contribution to the classification or clustering task. In such cases, concatenating all the features into a single feature space does not guarantee an optimum performance and in many cases it imposes large processing requirements.

The problem of classification in the case of multiple feature spaces or sources has been mostly dealt with in the past by ensemble learning methods (Dietterich, 2000), namely combinations of individual classifiers. The idea behind that approach is to train one classifier in every feature space and then combine their class predictive distributions. Different ways of combining the output of the classifiers have been studied (Kittler et al., 1998; Tax et al., 2000) and also meta-learning an overall classifier on these distributions (Wolpert, 1992) has been proposed.

The drawbacks of combining classifiers lie on both their theoretical justification and on the processing loads that exert as multiple training has to be performed. Their performance has been shown to significantly improve over the best individual classifier in many cases but the extra load of training multiple classifiers restrains their application when resources are limited. The typical combination rules for classifiers are ad hoc methods (Berger, 1985) that are based on the notions of the linear or independent opinion pools. However, as noted by Berger (1985), " . . . it is usually better to approximate a "correct answer" than to adopt a completely ad hoc approach." and this has a bearing, as we shall see, on the nature of classifier combination and the motivation for kernel combination.

In this paper we offer, for the classification problem, a multiclass kernel machine (Schölkopf and Smola, 2002; Shawe-Taylor and Cristianini, 2004) that is able to combine kernel spaces in an informative manner while at the same time learning their significance. The proposed methodology is general and can also be employed outside the "kernel-domain", i.e. without the need to embed the features into Hilbert spaces, by allowing for combination of basis function expansions. That is useful in the case of multi-scale problems and wavelets. The combination of kernels or basis functions as an alternative to classifier combination offers the advantages of reduced computational requirements, the ability to learn the significance of the individual sources and an improved solution based on the inferred significance.

Previous related work, includes the area of kernel learning, where various methodologies have been proposed in order to learn the possibly composite kernel matrix, by convex optimization methods (Lanckriet, 2004; Sonnenburg et al., 2006; Lewis et al., 2006a,b), by the introduction of hyper-kernels (Ong et al., 2005) or by direct ad-hoc construction of the composite kernel (Lee et al., 2007). These methods operate within the context of support vector machine (SVM) learning and hence inherit the arguable drawbacks of non-probabilistic outputs and ad hoc extensions to the multiclass case. Furthermore, another related approach within the non-parametric Gaussian process (GP) methodology (Neal, 1998; Rasmussen and Williams, 2006) has been proposed by Girolami and Zhong (2007), where instead of kernel combination the integration of information is achieved via combination of the GP covariance functions.

Our work further develops the work of Girolami and Rogers (2005), which we generalize to the multiclass case by employing a multinomial probit likelihood and introducing latent variables that give rise to efficient Gibbs sampling from the parameter posterior distribution. We bound the marginal likelihood or model evidence (MacKay, 1992) and derive the Variational Bayes (VB) approximation for the multinomial probit composite kernel model, providing a fast and efficient solution. We are able to combine kernels in a general way e.g. by summation, product or binary rules and learn the associated weights to infer the significance of the sources.

For the first time we offer, a VB approximation on an explicit multiclass model for kernel combination and a comparison between kernel combination methods, from summation to weighted product of kernels. Furthermore, we compare our methods against classifier combination strategies on a number of datasets and we show that the accuracy of our VB approximation is comparable to that of the full MCMC solution.

The paper is organised as follows. First we introduce the concepts of composite kernels, kernel combination rules and classifier combination strategies and give an insight on their theoretical underpinnings. Next we introduce the multinomial probit composite kernel model, the MCMC solution and the VB approximation. Finally, we present results on synthetic and benchmark datasets and offer discussion and concluding remarks.

2.2 Classifier Versus Kernel Combination

The theoretical framework behind classifier combination strategies has been explored relatively recently (at least in the classification domain for machine learning and pattern recognition. The related statistical decision theory literature has studied opinion pools much earlier, see Berger (1985) for a full treatment.) (Kittler et al., 1998; Dietterich, 2000), despite the fact that ensembles of classifiers have been widely used experimentaly before. We briefly review that framework in order to identify the common ground and the deviations from the classifier combination to the proposed kernel (or basis function) combination methodology.

Consider S feature spaces or sources of information (throughout this example again, m denotes scalar, m vector and M a Matrix. If M is a C×N matrix then $m_c$ is the $c^{th}$ row vector and $m_n$ the $n^{th}$ column vector of that matrix.). An object n belonging to a dataset $\{X, t\}$, with X the collection of all objects and t the corresponding labels, is represented by S, $D^s$-dimensional feature vectors $x_n^s$ for $s=1 \ldots S$ and $x_n^s \in \Re^{D^s}$. Let the number of classes be C with the target variable $t_n=c=1, \ldots, C$ and the number of objects N with $n=1, \ldots, N$. Then, the class posterior probability for object n will be $P(t_n|x_n^1, \ldots, x_n^s)$ and according to Bayesian decision theory we would assign the object n with the class that has the maximum a posteriori probability.

The classifier combination methodologies are based on the following assumption, which as we shall see is not necessary for the proposed kernel combination approach. The assumption is that although "it is essential to compute the probabilities of various hypotheses by considering all the measurements simultaneously . . . it may not be a practical proposition." (Kittler et al., 1998) and it leads to a further approximation on the (noisy) class posterior probabilities which are now broken down to individual contributions from classifiers trained on each feature space s.

The product combination rule, assuming equal a priori class probabilities:

$$P_{prod}(t_n | x_n^1, \ldots, x_n^S) = \frac{\prod_{s=1}^{S} P(t_n | x_n^s) + \epsilon_{c1}^s}{\sum_{t_n=1}^{C} \prod_{s=1}^{S} P(t_n | x_n^s) + \epsilon_{c1}^s} \quad (4)$$

The mean combination rule:

$$P_{mean}(t_n | x_n^1, \ldots, x_n^S) = \frac{1}{S} \sum_{s=1}^{S} P(t_n | x_n^s) + \epsilon_{c1}^s \quad (5)$$

with $\epsilon_{cl}^s$ the error made by the individual classifier trained on feature space s.

The theoretical justification for the product rule comes from the independence assumption of the feature spaces, where $x_n^1, \ldots, x_n^S$ are assumed to be uncorrelated; and the mean combination rule is derived on the opposite assumption of extreme correlation. As it can be seen from equations 4 and 5, the individual errors $\epsilon_{cl}^s$ of the classifiers are either added or multiplied together and the hope is that there will be a synergetic effect from the combination that will cancel them out and hence reduce the overall classification error.

Instead of combining classifiers we propose to combine the feature spaces and hence obtain the class posterior probabilities from the model $$P_{spaces}(t_n|x_n^1, \ldots, x_n^S) = P(t_n|x_n^1, \ldots, x_n^S) + \epsilon_{cl}$$

where now we only have one error term from the single classifier operating on the composite feature space. The different methods to construct the composite feature space reflect different approximations to the $P(t_n|x_n^1, \ldots, x_n^S)$ term without incorporating individual classifier errors into the approximation.

Although our approach is general and can be applied to combine basis expansions or kernels, we present here the composite kernel construction as our main example. Embedding the features into Hilbert spaces via the kernel trick (Schölkopf and Smola, 2002; Shawe-Taylor and Cristianini, 2004) we can define (superscripts denote "function of", i.e. $K^{\beta\Theta}$ denotes that the kernel K is a function of $\beta$ and $\Theta$, unless otherwise specified.):

The N×N mean composite kernel as $$K^{\beta\Theta}(x_i, x_j) = \sum_{s=1}^{S} \beta_s K^{s\theta_s}(x_i^s, x_j^s) \text{ with } \sum_{s=1}^{S} \beta_s = 1 \text{ and } \beta_s \geq 0 \forall s$$

The N×N product composite kernel (In this case only the superscript $\beta_s$ in $K^{s\theta_s}(x_i^s, x_j^s)^{\beta_s}$ denotes power. The superscript s in $K^s(.,.)$ or generally in $K^s$ indicates that this is the $s^{th}$ base kernel.) as $$K^{\beta\Theta}(x_i, x_j) = \prod_{s=1}^{S} K^{s\theta_s}(x_i^s, x_j^s)^{\beta_s} \text{ with } \beta_s \geq 0 \forall s$$

And the N×N binary composite kernel as $$K^{\beta\Theta}(x_i, x_j) = \sum_{s=1}^{S} \beta_s K^{s\theta_s}(x_i^s, x_j^s) \text{ with } \beta_s \in \{0, 1\} \forall s$$

where $\Theta$ are the kernel parameters, $\beta$ the combinatorial weights and K is the kernel function employed, typically in this study, a Gaussian or polynomial function. We can now weigh accordingly the feature spaces by the parameter $\beta$ which, as we shall see further on, can be inferred from the observed data. Notice that the product composite kernel can actually manipulate the structure of the individual kernels by the combinatorial weight power, in contrast with the mean and binary composite kernels which retain the structure and simply weigh accordingly each information source or channel.

2.3 The Multinomial Probit Model

In accordance with Albert and Chib (1993), we introduce auxiliary variables $Y \in \Re^{C \times N}$ that we regress onto with our composite kernel and the parameters (regressors) $W \in \Re^{C \times N}$ assuming a standard noise model $\epsilon \sim N(0, 1)$ which results in $y_{cn} = w_c k_n^{\beta\Theta} + \epsilon$, with $w_c$ the 1×N row vector of class c regressors and $k_n^{\beta\Theta}$ the N×1 column vector of inner products for the $n^{th}$ element, and leads to the following Gaussian probability distribution:

$$p(y_{cn}|w_c, k_n^{\beta\Theta}) = N_{y_{cn}}(w_c k_n^{\beta\Theta}, 1) \quad (6)$$

The link from the auxiliary variable $y_{cn}$ to the target variable of interest $t_n$ is given by $t_n = i \Leftrightarrow y_{in} > y_{jn} \forall j \neq i$ and by the following marginalization $P(t_n = i|W, k_n^{\beta\Theta}) = \int P(t_n = i|y_n) P(y_n|W, k_n^{\beta\Theta}) \, dy_n$, where $P(t_n = i|y_n)$ is a delta function, results in the multinomial probit likelihood as:

$$P(t_n = i | W, k_n^{\beta\Theta}) = \varepsilon_{p(u)}\left\{\prod_{j \neq i} \Phi(u + (w_i - w_j) k_n^{\beta\Theta})\right\} \quad (7)$$

where $\epsilon$ is the expectation taken with respect to the standardised normal distribution $p(u) = N(0, 1)$. We can now consider the prior and hyper-prior distributions to be placed on our model.

2.3.1 Prior Probabilities

In the graphical model in FIG. 13, the conditional relation of the model parameters and associated hyper and hyper-hyper-parameters can be seen for the case of the mean composite kernel with the accompanied variations in FIG. 14 for the binary and product composite kernel. We place a product of zero mean Gaussian distributions on the regressors $$W \sim \prod_{c=1}^{C} \prod_{n=1}^{N} N_{w_{cn}}(0, \zeta_{cn})$$

with scale $\zeta_{cn}$ (described by the variable Z in the graph) and an inversegamma distribution on each scale with hyper-hyper-parameters $\tau$, $\nu$, reflecting our lack of prior knowledge and taking advantage of the conjugacy of these distributions.

Furthermore, we place a gamma distribution on each kernel parameter since $\theta_{sd} \in \Re^+$. In the case of the mean composite kernel, a Dirichlet distribution with parameters $\rho$ is placed on the combinatorial weights in order to satisfy the constraints imposed on the possible values which are defined on a simplex. A further gamma distribution is placed on each $\rho_s$ with associated hyper-hyper-parameters $\mu$, $\lambda$. The hyper-hyper-parameters $\Xi = \{\tau, \nu, \omega, \phi, \mu, \lambda, \kappa, \xi\}$ can be set by type-II maximum likelihood or set to uninformative values.

In the product composite kernel case we employ the right dashed plate in FIG. 14 which places a gamma distribution on the combinatorial weights $\beta_s$ that do not need to be defined on a simplex anymore, with an exponential hyper-prior distribution on each of the parameters $\pi_s$, $\chi_s$.

Finally, in the binary composite kernel case we employ the left dashed plate in FIG. 14 which places a binomial distribution on each $\beta_s$ with equal probability of being 1 or zero (unless prior knowledge says otherwise). The small size of the possible $2^S$ states of the $\beta$ vector allows for their explicit consideration in the inference procedure and hence there is no need to place any hyper-prior distributions.

2.3.2 Exact Bayesian Inference: Gibbs Sampling

Exploiting the conditional distributions of Y|W, . . . and W|Y, . . . , a Gibbs sampler naturally arises so that we can draw samples from the parameter posterior distribution $P(\Psi|t, X, \Xi)$ where $\Psi = \{Y, W, \beta, \Theta, Z, \rho\}$ and $\Xi$ the aforementioned hyper-hyper-parameters of the model. In the case of non-conjugate pair of distributions, Metropolis-Hastings (MH) sub-samplers can be employed for posterior inference. More details of the Gibbs sampler are provided in Appendix A and in the previous example given.

2.3.3 Approximate Inference: Variational Approximation

An approximation to the exact solution for the multinomial probit composite kernel model can be offered, in similar manner to previous work by Girolami and Rogers (2006), via the variational methodology (Beal, 2003) which offers a lower bound on the model evidence by using an ensemble of factored posteriors to approximate the joint parameter posterior distribution. The joint likelihood of the model (The mean composite kernel is considered as an example. Modifications for the binary and product composite kernel are trivial and respective details are given in the appendices.) is defined as $p(t, \Psi|X, \Xi) = p(t|Y)p(Y|W, \beta)p(W|Z)p(Z|\tau, \nu)p(\beta|\rho)p(\rho|\mu, \lambda)$ and the factorable ensemble approximation of the required posterior is $p(\Psi|\Xi, X, t) \approx Q(\Psi) = Q(Y)Q(W)Q(\beta)Q(\Theta)Q(Z)Q(\rho)$. We can bound the model evidence using Jensen's inequality $$\log p(t) \geq \epsilon_{Q(\Psi)}\{\log p(t, \Psi|\Xi)\} - \epsilon_{Q(\Psi)}\{\log Q(\Psi)\} \quad (8)$$

and minimise it—the lower bound is given in Appendix E—with distributions of the form $Q(\Psi_i) \propto \exp(\epsilon_{Q(\Psi_{-i})}\{\log p(t, \Psi|\Xi)\})$ where $Q(\Psi_{-i})$ is the factorable ensemble with the $i^{th}$ component removed.

The resulting posterior distributions for the approximation are given below with full details of the derivations in Appendix B. First, the approximate posterior over the auxiliary variables is given by $$Q(Y) \propto \prod_{n=1}^{N} \delta(y_{i,n} > y_{k,n} \forall k \neq i) \delta(t_n = i) \mathcal{N}_{y_n}(\tilde{W}k_n^{\tilde{\beta}\Theta}, I) \quad (9)$$

which is a product of N C-dimensional conically truncated Gaussians. The shorthand tilde notation denotes posterior expectations in the usual manner, i.e. $\tilde{f}(\beta) = \epsilon_{Q(\beta)}\{f(\beta)\}$, and the posterior expectations (details in Appendix C) for the auxiliary variable follow as $$\tilde{y}_{cn} = \tilde{w}_c k_n^{\tilde{\beta}\Theta} - \frac{\epsilon_{p(u)}\{\mathcal{N}_u(\tilde{w}_c k_n^{\tilde{\beta}\Theta} - \tilde{w}_i k_n^{\tilde{\beta}\Theta}, 1)\Phi_u^{n,i,c}\}}{\epsilon_{p(u)}\{\Phi(u + \tilde{w}_i k_n^{\tilde{\beta}\Theta} - \tilde{w}_c k_n^{\tilde{\beta}\Theta})\Phi_u^{n,i,c}\}} \quad (10)$$

$$\tilde{y}_{in} = \tilde{w}_i k_n^{\tilde{\beta}\Theta} - \left(\sum_{c \neq i} \tilde{y}_{cn} - \tilde{w}_c k_n^{\tilde{\beta}\Theta}\right) \quad (11)$$

where $\Phi$ is the standardized cumulative distribution function (CDF) and $\Phi_u^{n,i,c} = \prod_{j \neq i,c} \Phi(u + \tilde{w}_j k_n)$. Next, the approximate posterior for the regressors can be expressed as $$Q(W) \propto \prod_{c=1}^{C} \mathcal{N}_{w_c}(\tilde{y}_c K^{\tilde{\beta}\Theta} V_c, V_c) \quad (12)$$

where the covariance is defined as $$V_c = \left(\sum_{i=1}^{S} \sum_{j=1}^{S} \tilde{B}_i \tilde{\beta}_j K^{i\tilde{\theta}_i} K^{j\tilde{\theta}_j} + (\tilde{Z}_c)^{-1}\right)^{-1} \quad (13)$$

and $\tilde{Z}_c$ is a diagonal matrix of the expected variances $\tilde{\zeta}_i \ldots \tilde{\zeta}_N$ for each class. The associated posterior mean for the regressors is therefore $\tilde{w}_c = \tilde{y}_c K V_c$ and we can see the coupling between the auxiliary variable and regressor posterior expectation.

The approximate posterior for the variances Z is an updated product of inverse-gamma distributions and the posterior mean is given by $$\frac{\tau + \frac{1}{2}}{\nu + \frac{1}{2}\tilde{w}_{cn}^2} \quad (14)$$

for details see Appendix B.3 or Denison et al. (2002). Finally, the approximate posteriors for the kernel parameters $Q(\Theta)$, the combinatorial weights $Q(\beta)$ and the associated hyperprior parameters $Q(\rho)$, or $Q(\pi)$, $Q(\chi)$ in the product composite kernel case, can be obtained by importance sampling (Andrieu, 2003) in a similar manner to Girolami and Rogers (2006) since no tractable analytical solution can be offered. Details are provided in Appendix B.

Having described the approximate posterior distributions of the parameters and hence obtained the posterior expectations we turn back to our original task of making class predictions $t^*$ for $N_{test}$ new objects $X^*$ that are represented by S different information sources $X^{s*}$ embedded into Hilbert spaces as base kernels $K^{*s\Theta_s,\beta_s}$ and combined into a composite test kernel $K^{*\Theta,\beta}$. The predictive distribution for a single new object $x^*$ is given by $p(t^*=c|x^*,X,t) = \int p(t^*=c|y^*) p(y^*|x^*, X, t) dy^* = \int \delta^*_c p(y^*|x^*, X, t) dy^*$ which ends up, see Appendix D for complete derivation, as $$p(t^* = c \mid x^*, X, t) = E_{p(u)}\left\{\prod_{j \neq c} \Phi\left[\frac{1}{\tilde{v}_j^*}\left(u\tilde{v}_c^* + \tilde{m}_c^* - \tilde{m}_j^*\right)\right]\right\} \quad (15)$$

where, for the general case of $N_{test}$ objects, $\tilde{m}^*_c = \tilde{y}_c K(K^*K^{*T} + V_c^{-1})^{-1} K^* \tilde{v}^*_c$ and $\tilde{v}^*_c = (I + K^{*T} V_c K^*)$ while we have dropped the notation for the dependance of the train $K(N \times N)$ and test $K^*(N \times N_{test})$ kernels on $\Theta$, $\beta$ for clarity. In algorithm 1 we summarize the VB approximation in a pseudoalgorithmic fashion.

Algorithm 1
VB Multinomial Probit Composite Kernel Regression

1: Initialize $\Xi$, sample $\Psi$, create $K_s|\beta_s, \theta_s$ and hence $K|\beta, \Theta$
2: while Lower Bound changing do
3: $\quad \tilde{w}_c \leftarrow \tilde{y}_c K V_c$ 4: $\quad \tilde{y}_{cn} \leftarrow \tilde{w}_c k_n^{\tilde{\beta}\Theta} - \frac{\epsilon_{p(u)}\{\mathcal{N}_u(\tilde{w}_c k_n^{\tilde{\beta}\Theta} - \tilde{w}_i k_n^{\tilde{\beta}\Theta}, 1)\Phi_u^{n,i,c}\}}{\epsilon_{p(u)}\{\Phi(u + \tilde{w}_i k_n^{\tilde{\beta}\Theta} - \tilde{w}_c k_n^{\tilde{\beta}\Theta})\Phi_u^{n,i,c}\}}$ 5: $\quad \tilde{y}_{in} \leftarrow \tilde{w}_i k_n^{\tilde{\beta}\Theta} - (\Sigma_{j \neq i} \tilde{y}_{jn} - \tilde{w}_j k_n^{\tilde{\beta}\Theta})$ 6: $\quad \zeta_{cn} \leftarrow \frac{\tau + \frac{1}{2}}{\nu + \frac{1}{2} \tilde{w}_{cn}^2}$ 7: $\quad \tilde{\rho}, \tilde{\beta}, \tilde{\Theta} \leftarrow \tilde{\rho}, \tilde{\beta}, \tilde{\Theta}|\tilde{w}_c, \tilde{y}_n$ by importance sampling
8: $\quad$ Update $K|\beta, \Theta$ and $V_c$
9: end while -continued Algorithm 1
VB Multinomial Probit Composite Kernel Regression 10: Create composite test kernel $K^*|\tilde{\beta}, \tilde{\Theta}$ 11: $\tilde{v}_c^* \leftarrow (I + K^{*T} V_c K^*)$ 12: $\tilde{m}_c^* \leftarrow \tilde{y}_c K(K^* K^{*T} + V_c^{-1})^{-1} K^* \tilde{V}_c^*$ 13: for n = 1 to $N_{test}$ do
14:    for c = 1 to C do
15:       for i = 1 to K Samples do 16:
$$u_i \leftarrow N(0,1), p_{cn}^i \leftarrow \prod_{j \neq c} \Phi\left[\frac{1}{\tilde{v}_j^*}\left(u_i \tilde{v}_c^* + \tilde{m}_c^* - \tilde{m}_j^*\right)\right]$$

17:       end for
18:    end for

19:
$$P(t_n^* = c \mid x_n^*, X, t) = \frac{1}{K}\sum_{i=1}^{K} p_{cn}^i$$

20: end for

2.4 Experimental Studies

This section presents the experimental findings of our work with emphasis first on the performance of the VB approximation with respect to the full MCMC Gibbs sampling solution and next on the efficiency of the proposed feature space combination method versus the well known classifier combination strategies. We employ an artificial low-dimensional dataset, first described by Neal (1998), for the comparison between the approximation and the full solution; standard UCI (Asuncion, A & Newman, D. J. (2007). UCI Machine Learning Repository [http://www.ics.uci.edu/mlearn/MLRepository.html]. Irvine, Calif.: University of California, Department of Information and Computer Science) multinomial datasets for an assesment of the VB performance; and finally, two well known large benchmark datasets to demonstrate the utility of the proposed feature space combination against ensemble learning and assess the performance of the different kernel combination methods.

Unless otherwise specified, all the hyper-hyper-parameters were set to uninformative values and the Gaussian kernel parameters were fixed to 1/D where D the dimensionality of the vectors. Furthermore, the convergence of the VB approximation was determined by monitoring the lower bound and the convergence occured when there was less than 0.1% increase in the bound or when the maximum number of VB iterations was reached. The burn-in period for the Gibbs sampler was set to 10% of the total number of samples. Finally, all the CPU times reported in this study are for a 1.6 GHz Intel based PC with 2 Gb RAM running Matlab codes and all the p-values reported are for a two sample t-test with the null hypothesis that the distributions have a common mean.

2.4.1 Synthetic Dataset

In order to assess the performance of the VB approximation against the full Gibbs sampling solution, we employ a low dimensional dataset in order to visualise the decision boundaries and posterior distributions produced by either method. With that in mind, we employ the 4-dimensional 3-class dataset $\{X, t\}$ with N=400, first described by Neal (1998), which defines the first class as points in an ellipse $\alpha > \chi_1^2 + \chi_2^2 > \beta$, the second class as points below a line $\alpha \chi_1 + \beta \chi_2 < \gamma$ and the third class as points surrounding these areas, see FIG. 15.

Figure 15:
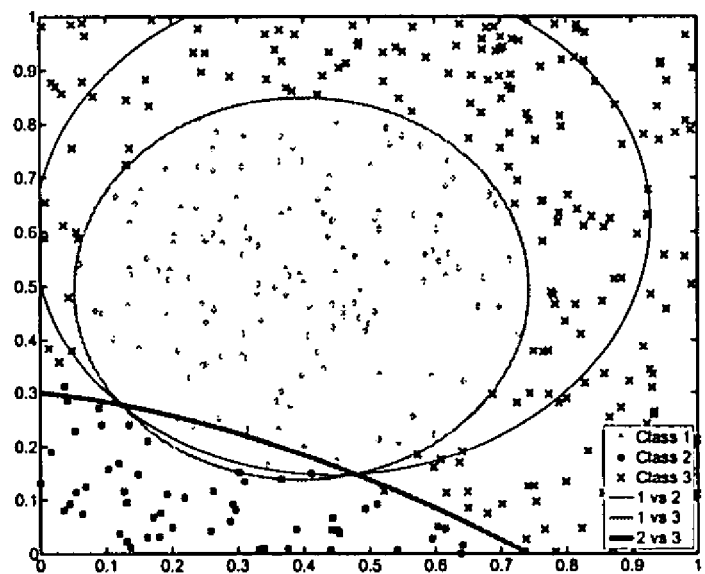
FIG. 15 is a graph illustrating decision boundaries from a Gibbs sampling solution.
Figure 16:
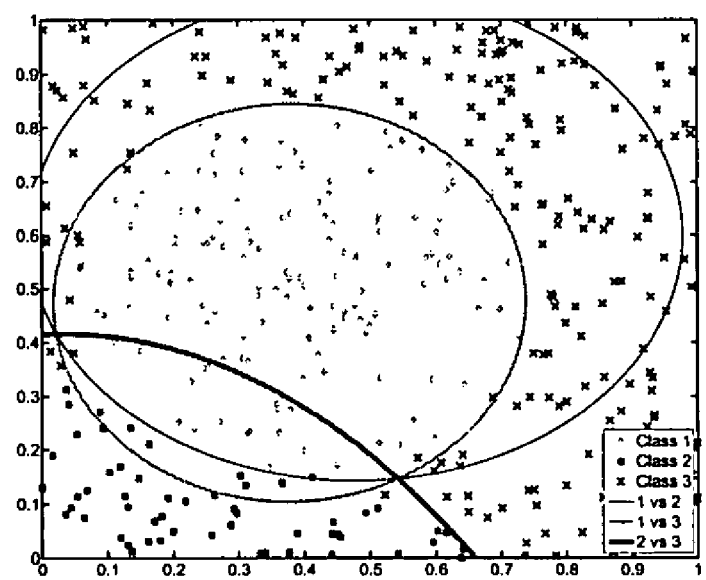
FIG. 16 is a graph illustrating decision boundaries from a Variational Bayes approximation.

We approach the problem by: 1) introducing a second order polynomial expansion on the original dataset $F(x_n) = [1\ \chi_{n1}\ \chi_{n2}\ \chi_{n1}^2\ \chi_{n1}\chi_{n2}\ \chi_{n2}^2]$ while disregarding the uninformative dimensions $\chi_3, \chi_4$, 2) modifying the dimensionality of our regressors W to C×D and analogously the corresponding covariance and 3) substituting F(X) for K in our derived methodology. Due to our expansion we now have a 2-D decision plane that we can plot and a 6-dimensional regressor w per class. In FIG. 15 we plot the decision boundaries produced from the full Gibbs solution by averaging over the posterior parameters after 100,000 samples and in FIG. 16 the corresponding decision boundaries from the VB approximation after 100 iterations.

As it can be seen, both the VB approximation and the MCMC solution produce similar decision boundaries leading to good classification performances—2% error for both Gibbs and VB for the above decision boundaries—depending on training size. However, the Gibbs sampler produces tighter boundaries due to the Markov Chain exploring the parameter posterior space more efficiently than the VB approximation.

This can be further demonstrated by plotting the resulting posterior distributions from both VB and Gibbs solutions against each other. In FIG. 17 the posterior distributions for the regressors w of class c=1 are plotted. As we can see there is correspondance between the posteriors but in some cases the VB has failed to discover the main probability mass of a parameter posterior and has settled for a less likely solution (a local maximum), still though, within the Gibbs estimated posterior area. Furthermore, the variances of the VB posterior distributions are extremely small and all the probability mass is concentrated in a very small area. This is due to the very nature of VB approximation and similar mean field methods that make extreme "judgments" as they do not explore the posterior space by Markov chains.

The corresponding CPU times are:

TABLE 4

CPU time (sec) comparison for 100,000 Gibbs samples versus 100 VB iterations. Notice that the number of VB iterations needed for the lower bound to converge is typically less than 100.

| Gibbs | VB |
| --- | --- |
| 41,720 (s) | 120.3 (s) |

2.4.2 Multinomial UCI Datasets

To further assess the VB approximation of the proposed multinomial probit classifier, we explore a selection of UCI multinomial datasets. The performances are compared against reported results (Manocha and Girolami, 2007) from well-known methods in the pattern recognition and machine learning literature. We employ a Gaussian (VB G), a $2^{nd}$ order polynomial (VB P) and a linear kernel (VB L) with the VB approximation and report 10-fold cross-validated (CV) error percentages, in Table 5, and CPU times, in Table 6, for a maximum of 50 VB iterations unless convergence has already occured. The comparison with the K-nn and PK-nn is for standard implementations of these methods, see Manocha and Girolami (2007) for details.

TABLE 5

10-fold cross-validated error percentages (mean ± std) on standard UCI multinomial datasets.

| | Dataset | | | | |
|---|---|---|---|---|---|
| | VB G | VB L | VB P | K-nn | PK-nn |
| Balance | 8.8 ± 3.64 | 12.16 ± 4.24 | 7.0 ± 3.29 | 11.52 ± 2.99 | 10.23 ± 3.02 |
| Crabs | 23.5 ± 11.31 | 13.5 ± 8.18 | 21.5 ± 9.14 | 15.0 ± 8.82 | 19.50 ± 6.85 |
| Glass | 27.9 ± 10.09 | 35.8 ± 11.81 | 28.4 ± 8.88 | 29.91 ± 9.22 | 26.67 ± 8.81 |
| Iris | 2.66 ± 5.62 | 11.33 ± 9.96 | 4.66 ± 6.32 | 5.33 ± 5.25 | 4.0 ± 5.62 |
| Soybean | 6.5 ± 10.55 | 6 ± 9.66 | 4 ± 8.43 | 14.50 ± 16.74 | 4.50 ± 9.56 |
| Vehicle | 25.6 ± 4 | 29.66 ± 3.31 | 26 ± 6.09 | 36.28 ± 5.16 | 37.22 ± 4.53 |
| Wine | 4.47 ± 5.11 | 2.77 ± 4.72 | 1.11 ± 2.34 | 3.92 ± 3.77 | 3.37 ± 2.89 |

TABLE 6

Running times (seconds) for computing 10-fold cross-validation results.

| Dataset | Balance | Crabs | Glass | Iris | Soybean | Vehicle | Wine |
|---|---|---|---|---|---|---|---|
| VB CPU time (s) | 2,285 | 270 | 380 | 89 | 19 | 3,420 | 105 |

2.4.3 Benchmark Datasets

Handwritten Numerals Classification In this section we report results demonstrating the efficiency of our kernel combination approach when multiple sources of information are available. Comparisons are made against combination of classifiers and also between different ways to combine the kernels as we have described previously. In order to assess the above, we make use of two datasets that have multiple feature spaces describing the objects to be classified. The first one is a large N=2000, multinomial C=10 and "multi-featured" S=4 UCI dataset, named "Multiple Features". The objects are handwritten numerals, from 0 to 9, and the available features are the Fourier descriptors (FR), the Karhunen-Loéve features (KL), the pixel averages (PX) and the Zernike moments (ZM). Tax et al. (2000) have previously reported results on this problem by combining classifiers but have employed a different test set which is not publicly available. Furthermore, we allow the rotation invariance property of the ZM features to cause problems in the distinction between digits 6 and 9. The hope is that the remaining feature spaces can compensate on the discrimination.

In Tables 7, 8 9 and 10, we report experimental results over 50 repeated trials where we have randomly selected 20 training and 20 testing objects from each class. For each trial we employ 1) A single classifier on each feature space, 2) the proposed classifier on the composite feature space. This allows us to examine the performance of combinations of classifiers versus combination of feature spaces. We report results from both the full MCMC solution and the VB approximation in order to analyse the possible degradation of the performance for the approximation. In all cases we employ the multinomial probit kernel machine using a Gaussian kernel with fixed parameters.

TABLE 7

Classification percentage error (mean ± std) of individual classifiers trained on each feature space.
Full MCMC Gibbs sampling - Single F.S

| FR | KL | PX | ZM |
|---|---|---|---|
| 27.3 ± 3.3 | 11.0 ± 2.3 | 7.3 ± 2 | 25.2 ± 3 |

As we can see from table 8 and 7 the two best performing ensemble learning methods outperform all of the individual classifiers trained on seperate feature spaces. With a p-value of $1.5\,e^{-07}$ between the Pixel classifier and the Product rule, it is a statistical significant difference. At the same time, all the kernel combination methods in table 9 match the best performing classifier combination approaches, with a p-value of 0.91 between the Product classifier

TABLE 8

Combinations of the individual classifiers based on four widely used rules: Product (Prod), Mean (Sum), Majority voting (Maj) and Maximum (Max).
Full MCMC Gibbs sampling - Comb. Classifiers

| Prod | Sum | Max | Maj |
|---|---|---|---|
| 5.1 ± 1.7 | 5.3 ± 2 | 8.4 ± 2.3 | 8.45 ± 2.2 |

TABLE 9

Combination of feature spaces. Gibbs sampling results for four feature space combination methods: Binary (Bin), Mean with fixed weights (FixSum), Mean with infered weights (WSum), product with fixed weights (FixProd) and product with infered weights (WProd).
Full MCMC Gibbs sampling - Comb. F.S

| Bin | FixSum | WSum | FixProd | WProd |
|---|---|---|---|---|
| 5.7 ± 2 | 5.5 ± 2 | 5.8 ± 2.1 | 5.2 ± 1.8 | 5.9 ± 1.2 |

TABLE 10

Combination of feature spaces. VB approximation.
VB approx. - Comb. F.S

| Bin | FixSum | WSum | FixProd | WProd |
|---|---|---|---|---|
| 5.53 ± 1.7 | 4.85 ± 1.5 | 6.1 ± 1.6 | 5.35 ± 1.4 | 6.43 ± 1.8 | combination rule and the product kernel combination method. Finally, from table 10 it is obvious that the VB approximation performs very well compared with the full Gibbs solution and even when combinatorial weights are infered, which expands the parameter space, there is no statistical difference, with a p-value of 0.47, between the MCMC and the VB solution.

Furthermore, the variants of our method that employ combinatorial weights offer the advantage of infering the significance of the contributing sources of information. In FIG. 18, we can see that the pixel (PX) and zernike moments (ZM)

feature spaces receive large weights and hence contribute significantly in the composite feature space. This is in accordance with our expectations, as the pixel feature space seems to be the best perfoming individual classifier and complementary predictive power mainly from the ZM channel is improving on that.

The results indicate that there is no benefit in the classification error performance when weighted combinations of feature spaces are employed. This is in agreement with past work by Lewis et al. (2006b) and Girolami and Zhong (2007). The clear benefit however remains the ability to infer the relative significance of the sources and hence gain a better understanding of the problem.

Protein Fold Classification The second multi-feature dataset we examine was first described by Ding and Dubchak (2001) and is a protein fold classification problem with C=27 classes and S=6 available feature spaces (approx. 20-D each). The dataset is available online (http://crd.lbl.gov/~cding/protein/) and it is divided in a train set of N=313 size and an independent test set with $N_{test}$=385. We use the original dataset and do not consider the feature modifications (extra features, modification of existing ones and omission of 4 objects) suggested recently in the work by (Shen and Chou, 2006) in order to increase prediction accuracy. In table 11 we report the performances of the individual classifiers trained on each feature space, in table 12 the classifier combination performances and in table 13 the kernel combination approaches. Furthermore, in table 14 we give the corresponding CPU time requirements between classifier and kernel combination methods for comparison.

The experiments are repeated over 5 randomly initialized trials for a maximum of 100 VB iterations by monitoring convergence with a 0.1% increase threshold on the lower bound progression. We employ $2^{nd}$ order polynomial kernels as they were found to give the best performances across all methods.

TABLE 11

Classification error percentage on the individual feature spaces: 1) Amino Acid composition (Comp), 2) Hydrophobicity profile (HP), 3) Polarity (Pol), 4) Polarizability (Polz), 5) Secondary structure (Str) and 6) van der Waals volume profile (Vol).
VB approximation - Single F.S

| Comp | Hydro | Pol | Polz | Str | Vol |
|---|---|---|---|---|---|
| 49.8 ± 0.6 | 63.4 ± 0.6 | 65.2 ± 0.4 | 66.3 ± 0.4 | 60.0 ± 0.25 | 65.6 ± 0.3 |

TABLE 12

Classification error percentages by combining the predictive distributions of the individual classifiers.
VB approximation - Comb. Classifiers

| Prod | Sum | Max | Maj |
|---|---|---|---|
| 49.8 ± 0.6 | 47.6 ± 0.4 | 53.7 ± 1.4 | 54.1 ± 0.5 |

TABLE 13

Classification error percentages by feature space combination.
VB approximation - Comb. F.S

| Bin | FixSum | WSum | FixProd | WProd |
|---|---|---|---|---|
| 40.7 ± 1.2 | 40.1 ± 0.3 | 44.4 ± 0.6 | 43.8 ± 0.14 | 43.2 ± 1.1 |

As it can be observed the best of the classifier combination methods outperform any individual classifier trained on a single feature space with a p-value between the Sum combination rule and the composition classifier of 2.3 e-02. However, all the kernel combination methods perform better than the best classifier combination with a p-value of 1.5 e-08 between the latter (FixSum) and the best performing classifier combination method (Sum). The corresponding CPU times show a ten-fold reduction by the proposed feature space combination method from the classifier combination approaches.

Furthermore, with a top performance of 38.3 error % for a single binary combination run (Bin) we match the state-of-the-art reported on the original dataset by Girolami and Zhong (2007) employing Gaussian process priors.

TABLE 14

Typical running times (seconds). Ten-fold reduction in CPU time by combining feature spaces.

| Method | Classifier Combination | F.S Combination |
|---|---|---|
| CPU time (sec) | 11,519 | 1,256 |

The best reported performance by Ding and Dubchak (2001) was a 56% accuracy (44% error) employing an all-vs-all method with $$S \times \frac{C \times (C-1)}{2} = 8,240 \text{ binary } SVM \text{ classifiers.}$$

We offer instead a single multiclass kernel machine able to combine the feature spaces and achieve a 60 to 62% accuracy in reduced computational time.

Finally, in FIG. 19 the combinatorial weights can be seen for the case of the mean and the product (Notice that for the product composite kernel the combinatorial weights are not restricted in the simplex.) composite kernel. The results are in agreement with the past work identifying the significance of the amino acid composition, hydrophobicity profile and secondary structure feature spaces for the classification task.

2.5 Discussion

A multinomial probit composite kernel classifier, based on a well-founded hierarchical Bayesian framework and able to instructively combine feature spaces has been presented in this work. The full MCMC MH within Gibbs sampling approach allows for exact inference to be performed and the proposed variational Bayes approximation reduces significantly computational requirements while retaining the same levels of performance. The proposed methodology enables inference to be performed in three significant levels by learning the combinatorial weights associated to each feature space, the kernel parameters associated to each dimension of the feature spaces and finally the parameters/regressors associated with the elements of the composite feature space.

An explicit comparison between the Gibbs sampling and the VB approximation has been presented. The approximate solution was found not to worsen significantly the classification performance and the resulting decision boundaries were similar to the MCMC approach, though the latter is producing tighter descriptions of the classes. The VB posteriors over the parameters were observed to be narrow as expected and all the probability mass was concentrated on a small area, however within the posterior distributions produced by the Gibbs solution.

The proposed feature space combination approach was found to be as good as, or outperforming the best classifier combination rule examined and achieving the state-of-the-art while at the same time offering a ten-fold reduction in computational time and a better scaling when multiple spaces are available. At the same time, contrary to the classifier combination approach, inference can be performed on the combinatorial weights of the composite feature space, enabling a better understanding of the significance of the sources. In comparison with previously employed SVM combinations for the multiclass problem of protein fold prediction, our method offers a significant improvement of performance while employing a single classifier instead of thousands, reducing the computational time from approximately 12 to 0.3 CPU hours.

A Gibbs Sampler

The conditional distribution for the auxiliary variables Y is a product of N C-dimensional conically truncated Gaussians given by $$\prod_{n=1}^{N} \delta(y_{in} > y_{jn} \forall j \neq i) \delta(t_n = i) \mathcal{N}_{y_n}(Wk_n^{\beta\Theta}, I)$$

and for the regressors W is a product of Gaussian distributions $$\prod_{c=1}^{C} \mathcal{N}_{w_c}(m_c, V_c)$$

where $m_c = y_c K^{\beta\Theta} V_c$ (row vector) and $V_c = (K^{\beta\Theta} K^{\beta\Theta} + Z_c^{-1})^{-1}$ hence by iteratively sampling from these distributions will lead the Markov chain to sample from the desired posterior distribution. The typical MH subsamplers employed, in the case of the mean composite kernel model have acceptance ratios $$A(\beta^i, \beta^*) = \min\left(1, \frac{\prod_{c=1}^{C}\prod_{n=1}^{N}\mathcal{N}_{y_{cn}}(w_c k_n^{\beta^*\Theta}, 1)\prod_{s=1}^{S}\beta_s^{*\rho_s-1}}{\prod_{c=1}^{C}\prod_{n=1}^{N}\mathcal{N}_{y_{cn}}(w_c k_n^{\beta^i\Theta}, 1)\prod_{s=1}^{S}\beta_s^{i\rho_s-1}}\right)$$

$$A(\rho^i, \rho^*) = \min\left(1, \frac{\Phi(\rho^*)\prod_{s=1}^{S}\beta_s^{\rho_s^*-1}\prod_{s=1}^{S}\rho_s^{*\mu-1}e^{-\lambda\rho_s^*}}{\Phi(\rho^i)\prod_{s=1}^{S}\beta_s^{\rho_s^i-1}\prod_{s=1}^{S}\rho_s^{i\mu-1}e^{-\lambda\rho_s^i}}\right)$$

where $\Phi(\rho) = \dfrac{\Gamma\left(\sum_{s=1}^{S}\rho_s\right)}{\prod_{s=1}^{S}\Gamma(\rho_s)}$ with the proposed move symbolised by * and the current state with i.

For the binary composite kernel, an extra Gibbs step is introduced in our model as $p(\beta_i = 0 | \beta_{-i}, Y, K^{s\Theta_s} \forall s \in \{1, \ldots, S\})$ which depends on the marginal likelihood given by $$p(Y | \beta, K^{s\theta_s} \forall s \in \{1, \ldots, S\}) = \prod_{c=1}^{C}(2\pi)^{-\frac{N}{2}}$$

$$|\Omega_c|^{-\frac{1}{2}} \exp\left\{-\frac{1}{2}y_c \Omega_c y_c^T\right\}$$

with $\Omega_c = I + K^{\beta\Theta} Z_c^{-1} K^{\beta\Theta}$.

The product composite kernel employs two MH subsamplers to sample $\beta$ (from a gamma distribution this time) and the hyper-parameters $\pi$, $\chi$. The kernel parameters $\Theta$ are inferred in all cases via an extra MH subsampler with acceptance ratio $$A(\Theta^i, \Theta^*) = \min\left(1, \frac{\prod_{s=1}^{S}\prod_{d=1}^{D}\theta_{sd}^*\prod_{c=1}^{C}\prod_{n=1}^{N}\mathcal{N}_{y_{cn}}(w_c k_n^{\beta\Theta^*}, 1)\theta_{sd}^{*\omega-1}e^{-\phi\theta_{sd}^*}}{\prod_{s=1}^{S}\prod_{d=1}^{D}\theta_{sd}^i\prod_{c=1}^{C}\prod_{n=1}^{N}\mathcal{N}_{y_{cn}}(w_c k_n^{\beta\Theta^i}, 1)\theta_{sd}^{i\omega-1}e^{-\phi\theta_{sd}^i}}\right)$$

Finally, the Monte Carlo estimate of the predictive distribution is used to assign the class probabilities according to a number of samples L drawn from the predictive distribution which, considering Eq. 7 and substituting for the test composite kernel $k*_n^{\beta\Theta}$ defines the estimate of the predictive distribution as $$P(t_* = c | x_*) = \frac{1}{L}\sum_{l=1}^{L}\varepsilon_{p(u)}\left\{\prod_{j \neq c}\Phi\left(u + (w_c^l - w_j^l)k^{*\beta^l\Theta^l}\right)\right\}$$

B Approximate Posterior Distributions

We give here the full derivations of the approximate posteriors for the model under the VB approximation. We employ a first order approximation for the kernel parameters $\Theta$, i.e. $\epsilon_{Q(\Theta)}\{K^{i\Theta_i}K^{j\Theta_j}\} \approx K^{i}K^{j}$, to avoid nonlinear contributions to the expectation. The same approximation is applied to the product composite kernel case for the combinatorial parameters $\beta$ where $\epsilon_{Q(\beta)}\{K^{i\beta_i}K^{j\beta_j}\} \approx K^{i}K^{j}$

B.1 Q(Y)

$Q(Y) \propto \exp\{E_{Q(W)Q(\beta)Q(\Theta)}\{\log J.L\}\} \propto$ $\exp\{E_{Q(W)Q(\beta)Q(\Theta)}\{\log p(t | Y) + \log p(Y | W, \beta, \Theta)\}\} \propto$ $$\prod_{n=1}^{N}\delta(y_{i,n} > y_{k,n} \forall k \neq i)\delta(t_n = i)\exp\{E_{Q(W)Q(\beta)Q(\Theta)}\log p(Y | W, \beta, \Theta)\}$$

where the exponential term can be analysed as follows:

$\exp\{E_{Q(W)Q(\beta)Q(\Theta)}\log p(Y | W, \beta)\} =$ $$\exp\left\{E_{Q(W)Q(\beta)Q(\Theta)}\log\prod_{n=1}^{N}\mathcal{N}_{y_n}(Wk_n^{\beta\Theta}, I)\right\} =$$

$$\exp\left\{E_{Q(W)Q(\beta)Q(\Theta)}\left\{\sum_{n=1}^{N}\log\frac{1}{(2\pi)^{\frac{C}{2}}|I|^{\frac{1}{2}}}\right.\right.$$

-continued $$\exp\left(-\frac{1}{2}(y_n - Wk_n^{\beta\Theta})^T(y_n - Wk_n^{\beta\Theta})\right)\bigg\} \bigg\} = \exp\bigg\{ E_{Q(W)Q(\beta)Q(\Theta)}$$

$$\bigg\{ \sum_{n=1}^{N} \left(-\frac{1}{2}(y_n^T y_n - 2y_n^T W K_n^{\beta\Theta} + (k_n^{\beta\Theta})^T W^T W k_n^{\beta\Theta})\right)\bigg\}\bigg\} =$$

$$\exp\bigg\{ \sum_{n=1}^{N} -\frac{1}{2}\bigg( y_n^T y_n - 2y_n^T \widetilde{W} k_n^{\beta\Theta} +$$

$$\sum_{i=1}^{S}\sum_{j=1}^{S} \widetilde{\beta_i \beta_j} (k_n^{i\theta_i})^T \widetilde{W^T W} k_n^{j\theta_j} k_n^{j\theta_j}\bigg)\bigg\}$$

where $k_n^{i_i}$ is the $n^{th}$ N-dimensional column vector of the $i^{th}$ base kernel with kernel parameters $\tilde{\theta}_i$. Now from this exponential term we can form the posterior distribution as a Gaussian and reach to the final expression:

$$Q(Y) \propto \prod_{n=1}^{N} \delta(y_{i,n} > y_{k,n} \forall k \neq i) \delta(t_n = i) N_{y_n}(\widetilde{W} k_n^{\beta\Theta}, I) \quad (16)$$

which is a C-dimensional conically truncated Gaussian.

B.2 Q(W)

$$Q(W) \propto \exp\{E_{Q(y)Q(\beta)Q(\zeta)Q(\Theta)}\{\log p(y \mid W, \beta) + \log p(W \mid \zeta)\}\} =$$

$$\exp\bigg\{ E_{Q(y)Q(\beta)Q(\Theta)}\bigg\{ \log \prod_{c=1}^{C} \mathcal{N}_{y_c}(w_c K^{\beta\Theta}, I) \bigg\} +$$

$$E_{Q(\zeta)}\bigg\{ \log \prod_{c=1}^{C} \mathcal{N}_{w_c}(0, Z_c) \bigg\}\bigg\} = \exp\bigg\{ E_{Q(y)Q(\beta Q(\Theta))}$$

$$\bigg\{ \sum_{c=1}^{C} \log \frac{1}{(2\pi)^{\frac{N}{2}}|I|^{\frac{1}{2}}} \exp\bigg\{-\frac{1}{2}(y_c - w_c K^{\beta\Theta})(y_c - w_c K^{\beta\Theta})^T\bigg\} \bigg\} +$$

$$E_{Q(\zeta)}\bigg\{ \sum_{c=1}^{C} \log \frac{1}{(2\pi)^{\frac{N}{2}}|Z_c|^{\frac{1}{2}}} \exp\bigg\{-\frac{1}{2}(w_c(Z_c)^{-1} w_c^T)\bigg\} \bigg\} =$$

$$\exp\bigg\{ E_{Q(y)Q(\beta)Q(\Theta)}\bigg\{ \sum_{c=1}^{C} -\frac{1}{2}(y_c y_c^T - 2y_c K^{\beta\Theta} w_c^T + w_c K^{\beta\Theta} K^{\beta\Theta} w_c^T) \bigg\} +$$

$$E_{Q(\zeta)}\bigg\{ \sum_{c=1}^{C} -\frac{1}{2} \log \prod_{n=1}^{N} \zeta_{cn} - \frac{1}{2} w_c(Z_c)^{-1} w_c^T \bigg\} \bigg\} =$$

$$\exp\bigg\{ \sum_{c=1}^{C} -\frac{1}{2}\bigg\{ \widetilde{y_c y_c^T} - 2\tilde{y}_c K^{\beta\Theta} w_c^T +$$

$$w_c \sum_{i=1}^{S}\sum_{j=1}^{S} \widetilde{\beta_i \beta_j} K^{i\theta_i} K^{j\theta_j} w_c^T +$$

$$\sum_{n=1}^{N} \widetilde{\log \zeta_{cn}} + w_c(\tilde{Z}_c)^{-1} w_c^T \bigg\} \bigg\}$$

Again we can form the posterior expectation as a new Gaussian:

$$Q(W) \propto \prod_{c=1}^{C} N_{w_c}(\tilde{y}_c K^{\beta\Theta} V_c, V_c) \quad (17)$$

where $V_c$ is the covariance matrix defined as:

$$V_c = \left( \sum_{i=1}^{S}\sum_{j=1}^{S} \widetilde{\beta_i \beta_j} K^{i\theta_i} K^{j\theta_j} + (\tilde{Z}_c)^{-1} \right)^{-1} \quad (18)$$

and $\tilde{Z}_c$ is a diagonal matrix of the expected variances $\tilde{\zeta}_{c\tilde{i}} \ldots \tilde{\zeta}_{c\tilde{N}}$ for each class.

B.3 Q(Z)

$$Q(Z) \propto \exp\{E_{Q(W)}(\log p(W \mid Z) + \log p(Z \mid \tau, \upsilon))\} =$$

$$\exp(E_{Q(W)}(\log p(W \mid Z))) p(Z \mid \tau, \upsilon)$$

Analysing the exponential term only:

$$\exp\bigg\{ E_{Q(W)}\bigg( \log \prod_{c=1}^{C}\prod_{n=1}^{N} \mathcal{N}_{w_{cn}}(0, \zeta_{cn}) \bigg) \bigg\} =$$

$$\exp\bigg\{ E_{Q(W)}\bigg( \sum_{c=1}^{C}\sum_{n=1}^{N} -\frac{1}{2}\log \zeta_{cn} - \frac{1}{2} w_{cn}^2 \zeta_{cn}^{-1} \bigg) \bigg\} =$$

$$\prod_{c=1}^{C}\prod_{n=1}^{N} \zeta_{cn}^{-\frac{1}{2}} \exp\bigg( -\frac{1}{2}\frac{\widetilde{w_{cn}^2}}{\zeta_{cn}} \bigg)$$

which combined with the p $(Z|\tau, \upsilon)$ prior Gamma distribution leads to our expected posterior distribution:

$$Q(Z) \propto \prod_{c=1}^{C}\prod_{n=1}^{N} \zeta_{cn}^{-(\tau+\frac{1}{2})+1} \frac{\upsilon^{\tau} e^{-\zeta_{cn}^{-1}\left(\upsilon + \frac{1}{2}\widetilde{w_{cn}^2}\right)}}{\Gamma(\tau)} =$$

$$\prod_{c=1}^{C}\prod_{n=1}^{N} \text{Gamma}\left( \zeta_{cn}^{-1} \bigg| \tau + \frac{1}{2}, \upsilon + \frac{1}{2}\widetilde{w_{cn}^2} \right)$$

B.4 Q($\beta$), Q($\rho$), Q($\Theta$), Q($\pi$), Q($\chi$)

Importance sampling techniques (Andrieu, 2003) are used to approximate these posterior distributions as they are intractable. We present the case of the mean composite kernel analytically and leave the cases of the product and binary composite kernel as a straightforward modifications.

For Q ($\rho$) we have: $p(\rho|\beta) \propto p(\beta|\rho)p(\rho|\mu, \lambda)$ The unnormalised posterior is:

$Q^*(\rho) = p(\beta|\rho)p(\rho|\mu, \lambda)$ and hence the importance weights are:

$$\mathcal{W}(\rho_i) = \frac{\frac{Q^*(\rho^{i'})}{\prod_{s=1}^{S} Gamma_{\rho_s^{i'}}(\mu, \lambda)}}{\sum_{i=1}^{I} \frac{Q^*(\rho^i)}{\prod_{s=1}^{S} Gamma_{\rho_s^i}(\mu, \lambda)}} = \frac{Dir(\rho^{i'})}{\sum_{i=1}^{I} Dir(\rho^i)}$$

where Gamma and Dir are the Gamma and Dirichlet distributions, while I is the total number of samples of $\rho$ taken until now from the product gamma distributions and i' denotes the current (last) sample. So now we can estimate any function $f$ of $\rho$ based on:

$$\tilde{f}(\rho) = \sum_{i=1}^{I} f(\rho)\mathcal{W}(\rho^i)$$

In the same manner as above but now for $Q(\beta)$ and $Q(\Theta)$ we can use the unnormalised posteriors $Q^*(\beta)$ and $Q^*(\Theta)$, where $p(\beta|\rho, Y, W) \propto p(Y|W, \beta) p(\beta|\rho)$ and $p(\Theta|\omega, \phi, Y, W) \propto p(Y|W, \Theta)p(\Theta|\omega, \phi)$ with importance weights defined as:

$$\mathcal{W}(\beta^i) = \frac{\frac{Q^*(\beta^{i'})}{Dir(\beta^{i'})}}{\sum_{i=1}^{I} \frac{Q^*(\beta^i)}{Dir(\beta^i)}} = \frac{\prod_{n=1}^{N} \mathcal{N}_{\tilde{y}_n}(\tilde{W}k_n^{\beta^{i'}}, I)}{\sum_{i=1}^{I} \prod_{n=1}^{N} \mathcal{N}_{\tilde{y}_n}(\tilde{W}k_n^{\beta^i}, I)}$$

and $$\mathcal{W}(\Theta^i) = \frac{\frac{Q^*(\Theta^{i'})}{Dir(\Theta^{i'})}}{\sum_{i=1}^{I} \frac{Q^*(\Theta^i)}{Dir(\Theta^i)}} = \frac{\prod_{n=1}^{N} \mathcal{N}_{\tilde{y}_n}(\tilde{W}k_n^{\Theta^{i'}}, I)}{\sum_{i=1}^{I} \prod_{n=1}^{N} \mathcal{N}_{\tilde{y}_n}(\tilde{W}k_n^{\Theta^i}, I)}$$

and again we can estimate any function g of $\beta$ and h of $\Theta$ as:

$$\tilde{g}(\beta) = \sum_{i=1}^{I} g(\beta)\mathcal{W}(\beta^i) \text{ and } \tilde{h}(\Theta) = \sum_{i=1}^{I} g(\Theta)\mathcal{W}(\Theta^i)$$

For the product composite kernel case we proceed in the same manner by importance sampling for Q ($\pi$) and Q ($\chi$).

C Posterior Expectations of Each $y_n$

As we have shown $$Q(Y) \propto \prod_{n=1}^{N} \delta(y_{i,n} > y_{k,n} \forall k \neq i)\delta(t_n = i)\mathcal{N}_{y_n}(\tilde{W}k_n^{\tilde{\beta}\Theta}, I).$$

Hence Q ($y_n$) is a truncated multivariate Gaussian distribution and we need to calculate the correction to the normalizing term $\mathcal{Z}$ caused by the truncation. Thus, the posterior expectation can be expressed as $$Q(y_n) = \mathcal{Z}_n^{-1} \prod_{c=1}^{C} \mathcal{N}_{y_{cn}}^{t_n}(\tilde{w}_c k_n^{\tilde{\beta}\Theta}, 1)$$

where the superscript $t_n$ indicates the truncation needed so that the appropriate dimension i (since $t_n = i \Leftrightarrow y_{in} > y_{jn} \forall, J \neq i$) is the largest.

Now, $Z_n = P(y_n \in C)$ where $C = \{y_n : y_{in} > y_{jn}\}$ hence $$\mathcal{Z}_n = \int_{-\infty}^{+\infty} \mathcal{N}_{y_{in}}(\tilde{w}_i k_n^{\tilde{\beta}\Theta}, 1) \prod_{j \neq i} \int_{-\infty}^{y_{in}} \mathcal{N}_{y_{jn}}(\tilde{w}_j k_n^{\tilde{\beta}\Theta}, 1) dy_{jn} dy_{in}$$

$$= \varepsilon_{p(u)} \left\{ \prod_{j \neq i} \Phi(u + \tilde{w}_i k_n^{\tilde{\beta}\Theta} - \tilde{w}_j k_n^{\tilde{\beta}\Theta}) \right\}$$

with $p(\mu) = \mathcal{N}(0, 1)$. The posterior expectation of $y_{cn}$ for all $c \neq i$ (the auxiliary variables associated with the rest of the classes except the one that object n belongs to) is given by $$\tilde{y}_{cn} = \mathcal{Z}_n^{-1} \int_{-\infty}^{+\infty} y_{cn} \prod_{j=1}^{C} \mathcal{N}_{y_{jn}}(\tilde{w}_j k_n^{\tilde{\beta}\Theta}) dy_{jn}$$

$$= \mathcal{Z}_n^{-1} \int_{-\infty}^{+\infty} \int_{-\infty}^{y_{in}} y_{cn} \mathcal{N}_{y_{cn}}(\tilde{w}_c k_n^{\tilde{\beta}\Theta}) \prod_{j \neq i,c} \mathcal{N}_{y_{in}}$$

$$(\tilde{w}_i k_n^{\tilde{\beta}\Theta}, 1)\Phi(y_{in} - \tilde{w}_j k_n^{\tilde{\beta}\Theta}) dy_{cn} dy_{in}$$

$$= \tilde{w}_c k_n^{\tilde{\beta}\Theta} - \mathcal{Z}_n^{-1} \varepsilon_{p(u)}$$

$$\left\{ \mathcal{N}_u(\tilde{w}_c k_n^{\tilde{\beta}\Theta} - \tilde{w}_i k_n^{\tilde{\beta}\Theta}, 1) \prod_{j \neq i,c} \Phi(u + \tilde{w}_i k_n^{\tilde{\beta}\Theta} - \tilde{w}_j k_n^{\tilde{\beta}\Theta}) \right\}$$

For the $i^{th}$ class the posterior expectation $y_{in}$ (the auxiliary variable associated with the known class of the $n^{th}$ object) is given by $$\tilde{y}_{in} = \mathcal{Z}_n^{-1} \int_{-\infty}^{+\infty} y_{in} \mathcal{N}_{y_{in}}(\tilde{w}_i k_n^{\tilde{\beta}\Theta}, 1) \prod_{j \neq i} \Phi(y_{in} - \tilde{w}_j k_n^{\tilde{\beta}\Theta}) dy_{in}$$

$$= \tilde{w}_i k_n^{\tilde{\beta}\Theta} + \mathcal{Z}_n^{-1} \varepsilon_{p(u)} \left\{ u \prod_{j \neq i} \Phi(u + \tilde{w}_i k_n^{\tilde{\beta}\Theta} - \tilde{w}_j k_n^{\tilde{\beta}\Theta}) \right\}$$

$$= \tilde{w}_i k_n^{\tilde{\beta}\Theta} + \sum_{c \neq i} (\tilde{w}_c k_n^{\tilde{\beta}\Theta} - \tilde{y}_{cn})$$

where we have made use of the fact that for a variable $\mu \mathcal{N}(0, 1)$ and any differentiable function $g(\mu)$, $\varepsilon\{\mu g(\mu)\} = \varepsilon\{g'(\mu)\}$.

D Predictive Distribution

In order to make a prediction $t^*$ for a new point $x^*$ we need to know:

$$p(t^* = c | x^*, X, t) = \int p(t^* = c | y^*)p(y^* | x^*, X, t) dy^*$$

$$= \int \delta_c^* p(y^* | x^*, X, t) dy^*$$

Hence we need to evaluate $$p(y^* | x^*, X, t) = \int p(y^* | W, x^*) p(W | X, t) dW$$

$$= \prod_{c=1}^{C} \int \mathcal{N}_{w_c K^*}(\tilde{y}_c^*, I) \mathcal{N}_{w_c}(\tilde{y}_c K V_c, V_c) dw_c$$

We proceed by analysing the integral, gathering all the terms depending on $w_c$, completing the square twice and reforming to $$p(y^* | x^*, X, t) = \qquad (19)$$

$$\prod_{c=1}^{C} \int \mathcal{N}_{y_c^*}(\tilde{y}_c K \Lambda_c K^* \tilde{\mathcal{V}}_c^*, \tilde{\mathcal{V}}_c^*) \mathcal{N}_{w_c}((y_c^* K^{*T} + \tilde{y}_c K) \Lambda_c, \Lambda_c)$$

with $$\tilde{\mathcal{V}}_c^* = (I - K^{*T} \Theta_c K^*)^{-1} \quad (Ntest \times Ntest)$$

and $$\Lambda_c = (K^* K^{*T} + V_c^{-1})^{-1} \quad (N \times N) \qquad (20)$$

Finally we can simplify $\tilde{v}_c^*$ by applying the Woodbury identity and reduce its form to:

$$\tilde{v}_c^* = (I + K^{*T} V_c K^*) \quad (Ntest \times Ntest)$$

Now the Gaussian distribution wrt $w_c$ integrates to one and we are left with $$p(y^* | x^*, X, t) = \prod_{c=1}^{C} \mathcal{N}_{y_c^*}(\tilde{m}_c^*, \tilde{\mathcal{V}}_c^*) \qquad (21)$$

where $\tilde{m}_c^* = \tilde{y}_c K \Lambda_c K^* \tilde{\mathcal{V}}_c^* \quad (1 \times Ntest)$ Hence we can go back to the predictive distribution and consider the case of a single test point (i.e. Ntest=1) with associated scalars $\tilde{m}_c^*$ and $\tilde{v}_c^*$ $$p(t^* = c | x^*, X, t) = \int \delta_c^* \prod_{c=1}^{C} \mathcal{N}_{y_c^*}(\tilde{m}_c^*, \tilde{v}_c^*) dy_c^*$$

$$= \int_{-\infty}^{+\infty} \mathcal{N}_{y_c^*}(\tilde{m}_c^*, \tilde{v}_c^*) \prod_{j \neq c} \int_{-\infty}^{y_c^*} \mathcal{N}_{y_j^*}$$

$$(\tilde{m}_j^*, \tilde{v}_j^*) dy_j^* dy_c^*$$

$$= \int_{-\infty}^{+\infty} \mathcal{N}_{y_c^* - \tilde{m}_c^*}(0, \tilde{v}_c^*) \prod_{j \neq c} \int_{-\infty}^{y_c^* - \tilde{m}_j^*}$$

$$\mathcal{N}_{y_j^* - \tilde{m}_j^*}(0, \tilde{v}_j^*) dy_j^* dy_c^*$$

Setting $u = (y_c^* - \tilde{m}_c^*) \tilde{v}_c^{*-1}$ and $x = (y_c^* - \tilde{m}_j^*) \tilde{v}_j^{*-1}$ we have:

$$p(t^* = c | x^*, X, t) = \int_{-\infty}^{+\infty} \mathcal{N}_u(0, 1) \prod_{j \neq c} \int_{-\infty}^{(u\tilde{v}_c^* + \tilde{m}_c^* - \tilde{m}_j^*) \tilde{v}_j^{*-1}}$$

$$\mathcal{N}_x(0, 1) dx du$$

$$= E_{p(u)} \left\{ \prod_{j \neq c} \Phi \left[ \frac{1}{\tilde{v}_j^*} (u\tilde{v}_c^* + \tilde{m}_c^* - \tilde{m}_j^*) \right] \right\}$$

E Lower Bound

From Jensen's inequality in Eq. 8 and by conditioning on current values of $\beta, \Theta, Z, \rho$ we can derive the variational lower bound using the relevant components $$\varepsilon_{Q(Y)Q(W)}\{\log p(Y | W, \beta, X)\} + \qquad (22)$$

$$\varepsilon_{Q(Y)Q(W)}\{\log p(W | Z, X)\} - \qquad (23)$$

$$\varepsilon_{Q(Y)}\{\log Q(Y)\} - \qquad (24)$$

$$\varepsilon_{Q(W)}\{\log Q(W)\} \qquad (25)$$

which, by noting that the expectation of a quadratic form under a Gaussian is another quadratic form plus a constant, leads to the following expression for the lower bound $$-\frac{NC}{2} \log 2\pi - \frac{1}{2} \sum_{c=1}^{C} \sum_{n=1}^{N} \left\{ y_{cn}^2 + k_n^T \widetilde{w_c w_c} k_n - 2 \tilde{y}_{cn} \tilde{w}_c k_n \right\} -$$

$$\frac{NC}{2} \log 2\pi - \frac{1}{2} \sum_{c=1}^{C} \log |Z_c| - \frac{1}{2} \sum_{c=1}^{C} \tilde{w}_c Z_c^{-1} \tilde{w}_c^T -$$

$$\frac{1}{2} \sum_{c=1}^{C} Tr[Z_c^{-1} V_c] + \sum_{n=1}^{N} \log \mathcal{Z}_n + \frac{NC}{2} \log 2\pi +$$

$$\frac{1}{2} \sum_{n=1}^{N} \sum_{c=1}^{C} (y_{cn}^2 - 2 \tilde{y}_{cn} \tilde{w}_c k_n + k_n^T \tilde{w}_c^T \tilde{w}_c k_n) + \frac{NC}{2} \log 2\pi + \frac{1}{2} \sum_{c=1}^{C} \log |V_c| + \frac{NC}{2}$$

which simplifies to our final expression $$\text{Lower Bound} = \frac{NC}{2} + \frac{1}{2} \sum_{c=1}^{C} \log |V_c| + \sum_{n=1}^{N} \log \mathcal{Z}_n - \qquad (26)$$

$$\frac{1}{2} \sum_{c=1}^{C} Tr[Z_c^{-1} V_c] - \frac{1}{2} \sum_{c=1}^{C} \tilde{w}_c Z_c^{-1} \tilde{w}_c^T - \qquad (27)$$

$$\frac{1}{2} \sum_{c=1}^{C} \log |Z_c| - \frac{1}{2} \sum_{c=1}^{C} \sum_{n=1}^{N} k_n^T V_c k_n \qquad (28)$$

REFERENCES

Albert, J., Chib, S., 1993. Bayesian analysis of binary and polychotomous response data. Journal of the American Statistical Association 88, 669-679.

Andrieu, C., 2003. An introduction to MCMC for machine learning. Machine Learning 50, 5-43.

Beal, M. J., 2003. Variational algorithms for approximate Bayesian inference. Ph.D. thesis, The Gatsby Computational Neuroscience Unit, University College London.

Bellman, R., 1961. Adaptive Control Processes: A Guided Tour. Princeton University Press.

Berger, J. O., 1985. Statistical Decision Theory and Bayesian Analysis. Springer Series in Statistics, Springer.

Bishop, C. M., 2006. Pattern Recognition and Machine Learning. Springer, N.Y., USA.

Denison, D. G. T., Holmes, C. C., Mallick, B. K., Smith, A. F. M., 2002. Bayesian Methods for Nonlinear Classification and Regression. Wiley Series in Probability and Statistics, West Sussex, UK.

Dietterich, T. G., 2000. Ensemble methods in machine learning. In: Proceedings of the $1^{st}$ International Workshop on Multiple Classifier Systems. pp. 1-15.

Ding, C., Dubchak, I., 2001. Multi-class protein fold recognition using support vector machines and neural networks. Bioinformatics 17 (4), 349-358.

Girolami, M., Rogers, S., 2005. Hierarchic Bayesian models for kernel learning. In: Proceedings of the $22^{nd}$ International Conference on Machine Learning. pp. 241-248.

Girolami, M., Rogers, S., 2006. Variational Bayesian multinomial probit regression with Gaussian process priors. Neural Computation 18 (8), 1790-1817.

Girolami, M., Zhong, M., 2007. Data integration for classification problems employing Gaussian process priors. In: Twentieth Annual Conference on Neural Information Processing Systems.

Hastie, T., Tibshirani, R., Friedman, J., 2001. The Elements of Statistical Learning. Springer Series in Statistics, Springer.

Hastings, W. K., 1970. Monte Carlo sampling methods using Markov chains and their applications. Biometrika 57, 97-109.

Holmes, C. C., Held, L., 2006. Bayesian auxiliary variable models for binary and multinomial regression. Bayesian Analysis 1, 145-168.

Kittler, J., Hatef, M., Duin, R. P. W., Matas, J., 1998. On combining classifiers. IEEE Transactions on Pattern Analysis and Machine Intelligence 20 (3), 226-239.

Lanckriet, G. R. G., 2004. Learning the kernel matrix with semidefinite programming. Journal of Machine Learning Research 5, 27-72.

Lee, W.-J., Verzakov, S., Duin, R. P., 2007. Kernel combination versus classifier combination. In: 7th International Workshop on Multiple Classifier Systems.

Lewis, D. P., Jebara, T., Noble, W. S., 2006a. Nonstationary kernel combination. In: 23rd International Conference on Machine Learning.

Lewis, D. P., Jebara, T., Noble, W. S., 2006b. Support vector machine learning from heterogeneous data: an empirical analysis using protein sequence and structure. Bioinformatics 22 (22), 2753-2760.

MacKay, D., 2003. Information Theory, Inference and Learning Algorithms. Cambridge University Press.

MacKay, D. J. C., 1992. The evidence framework applied to classification networks. Neural Computation 4 (5), 698-714.

Manocha, S., Girolami, M. A., 2007. An empirical analysis of the probabilistic k-nearest neighbour classifier. Pattern Recognition Letters.

Neal, R. M., 1998. Regression and Classification using Gaussian process priors. Bayesian Statistics 6, 475-501.

Newman, D., Hettich, S., Blake, C., Merz, C., 1998. UCI repository of machine learning databases. URL http://www.ics.uci.edu/~mlearn/

Ong, C. S., Smola, A. J., Williamson, R. C., 2005. Learning the kernel with hyperkernels. Journal of Machine Learning Research 6, 1043-1071.

Pavlidis, P., Weston, J., Cai, J., Grundy, N. W., 2001. Gene functional classification from heterogenous data. In: 5th Annual International Conference on Computational Molecular Biology. pp. 242-248.

Rasmussen, C. E., Williams, C. K. I., 2006. Gaussian Processes for Machine Learning. MIT Press, Cambridge, Mass., USA.

Schölkopf, B., Smola, A., 2002. Learning with Kernels. The MIT Press.

Shawe-Taylor, J., Cristianini, N., 2004. Kernel Methods for Pattern Analysis. Cambridge University Press.

Shen, H.-B., Chou, K.-C., 2006. Ensemble classifier for protein fold pattern recognition. Bioinformatics 22 (14), 1717-1722.

Sonnenburg, S., Rätsch, G., Schäfer, C., 2006. A general and efficient multiple kernel learning algorithm. In: Weiss, Y., Schölkopf, B., Platt, J. (Eds.), Advances in Neural Information Processing Systems 18. MIT Press, Cambridge, Mass., pp. 1273-1280.

Tax, D. M. J., van Breukelen, M., Duin, R. P. W., Kittler, J., 2000. Combining multiple classifiers by averaging or by multiplying? Pattern Recognition 33, 1475-1485.

Wolpert, D. H., 1992. Stacked generalization. Neural Networks 5 (2), 241-259.

Various modifications may be made to the above described embodiment within the scope of the invention, for example, in other embodiments the statistical model may be based on non-Bayesian techniques. In other embodiments, different or additional devices may be used to provide information for the statistical models.

The statistical model described above has broad applicability within the computing field, and may be deployed in networks other than self-service terminal networks.

In other embodiments more or fewer than four base kernels may be used.

In other embodiments, the management center 114 may issue updated risk parameters to ATMs 10 in the network 100. The risk parameters may be issued regularly (for example, weekly) or in response to an event (for example, whenever fraud is detected on ATMs 10 in the network 100 and/or on ATMs in other networks in the same geographic region). The risk parameter may indicate a lower predetermined threshold above which each ATM 10 should raise an alert. For example, if the predetermined threshold was 60%, as in the embodiment above, then this may be lowered to 50% if fraud is detected in the same geographic region, or if there is information from law enforcement that fraud is expected. This allows the management center 114 to manage the network's response to potential fraud.

In other embodiments, the statistical model may have the same parameters irrespective of the operating mode of the ATM.

In other embodiments, the fraud criterion may be not be based on a predetermined threshold. For example, the fraud criterion may be based on a probability of fraud that is a predetermined percentage higher than a previous prediction. Thus, if the probability of abnormal behaviour is 15% at one time, and immediately after it is calculated as 45%, then an alert may be triggered because of a 200% rise in the probability of abnormal behaviour. The fraud criterion may be calculated based on a plurality of factors.

In other embodiments, SSTs other than ATMs may be used, for example, check in terminals. In other embodiments using ATMs, lobby ATMs may be used in addition to or instead of through-the-wall ATMs.

In other embodiments, the classifier may provide probabilities for multiple classes, such as normal, suspicious, abnormal, and the like.

In other embodiments, the banknote acceptance module may be a free-standing unit, such as a currency counter. Alternatively, the banknote acceptance module may be incorporated into an SST, such as an ATM. The banknote acceptance module may recycle (that is, dispense to a customer) banknotes previously received by the banknote acceptance module.

The invention claimed is:

1. A method of detecting attempted fraud at a self-service terminal, the method comprising:
   providing a classifier having a plurality of input zones, each input zone being adapted to receive data of a different modality;
   mapping inputs from a plurality of sensors in the self-service terminal to respective input zones of the classifier;
   for each input zone, independently operating on inputs within that zone to create a weighted set;
   combining the weighted sets using a dedicated weighting function for each weighted set to produce a composite set; and
   deriving a plurality of class values from the composite set to create a classification result.

2. A method according to claim 1, wherein operating on inputs within a zone to create a weighted set comprises using base kernels to create a weighted set.

3. A method according to claim 1, wherein deriving a plurality of class values from the composite set to create a classification result includes using regression techniques to derive the plurality of class values.

4. A method according to claim 1, wherein providing a classifier having a plurality of input zones includes providing a Bayesian model as the classifier.

5. A method according to claim 1, wherein the classifier uses different parameters for different operating modes of the self-service terminal.

6. A computerized method of detecting attempted fraud at a self-service terminal, the method comprising:
   providing a statistical model comprising a statistical classifier, the statistical classifier including a hierarchy of kernels;
   mapping inputs from sensors in the self-service terminal into the statistical classifier including mapping the inputs into the hierarchy of kernels; and
   operating on the inputs using the hierarchy of kernels of the statistical classifier to classify the inputs and to predict a probability of fraud from classified inputs by a processor of the self-service terminal.

7. A method according to claim 6, further comprising communicating an alarm signal to a remote management system in the event that the probability of fraud exceeds a predetermined level.

8. A self-service terminal comprising:
   a plurality of customer interaction devices; and
   a controller coupled to the customer interaction devices for controlling their operation, the controller including a statistical model including a statistical classifier, the statistical classifier including a hierarchy of kernels to classify inputs received from the customer interaction devices and to predict a probability of fraud based on classified inputs.

9. A self-service terminal according to claim 8, wherein the terminal is an automated teller machine ((Original) ATM).

10. A method of operating a network of self-service terminals coupled to a management system, where each terminal includes a statistical classifier including a hierarchy of kernels for classifying inputs received from customer interaction devices of the self-service terminals and for predicting fraud based on classified inputs during customer operation of that terminal, the method comprising:
    receiving a communication from a self-service terminal indicating that the classifier in that terminal has predicted a probability of fraud based on the classified inputs from the hierarchy of kernels during the customer operation; and
    triggering a dispatch signal to dispatch a customer engineer to the self-service terminal to ascertain if fraud is being perpetrated.

11. A method according to claim 10, wherein the management system is operable to transmit an updated statistical model for a classifier in the event that a new statistical model becomes available.

12. A method according to claim 10, wherein the management system is operable to transmit a risk parameter that indicates a probability of fraud value that must be met for the terminal to indicate fraud.

* * * * *